(12) United States Patent
Gao

(10) Patent No.: US 11,464,037 B2
(45) Date of Patent: Oct. 4, 2022

(54) METHOD AND APPARATUS FOR TRANSMITTING UPLINK CONTROL INFORMATION (UCI)

(71) Applicant: China Academy of Telecommunications Technology, Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 318 days.

(21) Appl. No.: 16/337,395

(22) PCT Filed: Jul. 12, 2017

(86) PCT No.: PCT/CN2017/092648
§ 371 (c)(1),
(2) Date: Mar. 27, 2019

(87) PCT Pub. No.: WO2018/059073
PCT Pub. Date: Apr. 5, 2018

(65) Prior Publication Data
US 2020/0037349 A1    Jan. 30, 2020

(30) Foreign Application Priority Data

Sep. 29, 2016 (CN) .......................... 201610868469.6

(51) Int. Cl.
*H04W 72/12* (2009.01)
*H04L 5/00* (2006.01)

(52) U.S. Cl.
CPC ......... *H04W 72/1284* (2013.01); *H04L 5/001* (2013.01); *H04L 5/0053* (2013.01); *H04W 72/1268* (2013.01)

(58) Field of Classification Search
None
See application file for complete search history.

(56) References Cited

U.S. PATENT DOCUMENTS 10,271,316 B2 * 4/2019 Nogami ............ H04W 72/0413
10,736,131 B2 * 8/2020 Shimezawa ....... H04W 72/1289
(Continued)

FOREIGN PATENT DOCUMENTS

CN       102045861 A     5/2011
WO      2016143967 A1    9/2016

OTHER PUBLICATIONS

LG Electronics; "Discussion on sPUSCH design with TTI shortening"; 3GPP TSG RAN WG1 Meeting #85; R1-164544; Nanjing, China, May 23-27, 2016.
(Continued)

*Primary Examiner* — Kodzovi Acolatse
(74) *Attorney, Agent, or Firm* — Kilpatrick Townsend & Stockton, LLP

(57) ABSTRACT

Disclosed in the present invention are a method and apparatus for transmitting uplink control information (UCI), solving the problem of UCI transmission in a short transmission time interval (TTI). The method comprises: a terminal determining a short transmission time interval (TTI) position and/or a short uplink channel for transmitting UCI; and the terminal transmitting the UCI on the determined short-TTI position and/or the short uplink channel, thereby providing a solution for transmitting periodic UCI in a short-TTI, and thus ensuring that the periodic UCI may be normally transmitted in the short-TTI.

10 Claims, 15 Drawing Sheets

(56) References Cited

U.S. PATENT DOCUMENTS

| | | | |
|---|---|---|---|
| 2017/0332397 A1* | 11/2017 | Li | H04L 1/1887 |
| 2018/0048451 A1* | 2/2018 | Yin | H04W 72/0446 |
| 2018/0076942 A1* | 3/2018 | Nory | H04W 52/346 |
| 2018/0242347 A1* | 8/2018 | Sahlin | H04W 72/0446 |
| 2018/0359068 A1* | 12/2018 | Kim | H04W 72/14 |
| 2018/0375619 A1* | 12/2018 | Hwang | H04W 72/0446 |
| 2019/0098622 A1* | 3/2019 | Lee | H04W 72/0446 |
| 2019/0110311 A1* | 4/2019 | Falconetti | H04W 72/0453 |
| 2019/0116611 A1* | 4/2019 | Lee | H04W 72/1284 |
| 2019/0174428 A1* | 6/2019 | Shao | H04W 52/146 |
| 2019/0174493 A1* | 6/2019 | Horiuchi | H04W 52/34 |
| 2019/0230657 A1* | 7/2019 | Kim | H04W 76/27 |
| 2019/0254049 A1* | 8/2019 | Takeda | H04W 72/04 |
| 2019/0296864 A1* | 9/2019 | Li | H04W 76/28 |
| 2019/0394768 A1* | 12/2019 | Kim | H04L 1/0026 |
| 2020/0275465 A1* | 8/2020 | Horiuchi | H04W 56/005 |

OTHER PUBLICATIONS

Ericsson: "Physical design aspects of sPUCCH"; 3GPP TSG-RAN WG1 #85; R1-165297; Nanjing, P.R. China, May 23-27, 2016.

Huawei, HiSilicon; "Processing time reduction and related procedures for short TTI"; 3GPP TSG RAN WG1 Meeting #86; R1-166158; Gothenburg, Sweden, Aug. 22-26, 2016.

CATT,"Remaining issues on CQI definition", 3GPP TSG RAN WG1 meeting #70,Qingdao, China, Aug. 13-17, 2012, total 2 pages, R1-123215.

NTT Docomo, Inc.,"Discussion on UCI transmission for eLAA UL", 3GPP TSG RAN WG1 Meeting #85,Nanjing, China, May 23-27, 2016, total 5 pages, R1-165188.

Huawei, HiSilicon, "UCI on sPUSCH", 3GPPTSG RAN WG1 Meeting #86, R1-166154, Gothenburg, Sweden, Aug. 22-26, 2016.

Ericsson, "UCI on sPUSCH with short TTI", 3GPP TSG-RAN WG1 #86, R1-167492, Göteborg, Sweden, Aug. 22-26, 2016.

"sPUCCH design for sTTI", 3GPP TSG RAN WG1 Meeting #86bis, R1-1608750, Gothenburg, Sweden Aug. 22-26, 2016, 3 pages.

"Discussion on the simultaneous transmissions of (s)PUCCH and (s)PUSCH", 3GPP TSG RAN WG1 Meeting #86bis, R1-1608751, Gothenburg, Sweden Aug. 22-26, 2016, 5 pages.

"UCI transmission for LTE STTI", 3GPP TSG RAN WG1 Meeting #86bis, R1-1608752, Gothenburg, Sweden Aug. 22-26, 2016, 3 pages.

* cited by examiner

METHOD AND APPARATUS FOR TRANSMITTING UPLINK CONTROL INFORMATION (UCI)

This application is a National Stage of International Application No. PCT/CN2017/092648, filed Jul. 12, 2017, which claims priority to Chinese Patent Application No. 201610868469.6, filed Sep. 29, 2016, both of which are hereby incorporated by reference in their entireties.

FIELD

The present invention relates to the field of communications, and particularly to a method and device for transmitting Uplink Control Information (UCI).

BACKGROUND

FIG. 1 illustrates a Frame Structure type 1 (FS1) for an existing Long Term Evolution (LTE) Frequency Division Duplex (FDD) system. In the FDD system, there are different carrier frequencies for uplink and downlink transmission, and there is a same frame structure for both uplink and downlink transmission. On each carrier, a radio frame with a length of 10 ms includes ten 1 ms sub-frames, and each sub-frame further includes two timeslots with a length of 0.5 ms. A length of time of a Transmission Time Interval (TTI) for uplink and downlink data transmission is 1 ms.

FIG. 2 illustrates a Frame Structure type 2 (FS2) for an existing LTE Time Division Duplex (TDD) system. In the TDD system, there are different sub-frames or timeslots, at a same frequency, for uplink and downlink transmission. In the FS2, each 10 ms radio frame includes two 5 ms half-frames, and each half-frame includes five sub-frames with a length of 1 ms. The sub-frames in the FS2 are categorized into downlink sub-frames, uplink sub-frames, and special sub-frames, and each special sub-frame includes three components of a Downlink Pilot Time Slot (DwPTS), a Guard Period (GP), and an Uplink Pilot Time Slot (UpPTS). Each half-frame includes at least one downlink sub-frame, at least one uplink sub-frame, and at most one special sub-frame.

In the related art, both a Scheduling Request (SR) and periodic Channel State Information (CSI) is transmitted in the unit of a sub-frame, and their report periodicities and offsets are also configured in the unit of a sub-frame. As there is a growing demand for mobile communication services, higher user-plane delay performance as required for future mobile communication systems has been defined. A user-plane delay is generally shortened by reducing a length of a Transmission Time Interval (TTI) to support short-TTI transmission, so there are a plurality of short-TTI transmission instances shorter than 1 ms in a sub-frame structure defined in the existing LTE mechanism. In short-TTI transmission, a shortened Physical Uplink Shared Channel (sPUSCH) and a shortened Physical Uplink Control Channel (sPUCCH) are supported by the uplink, where the sPUCCH can carry at least ACKnowledgement/Non-ACKnowledgement (ACK/NACK) feedback information for downlink transmission in a short-TTI. A length of the short-TTI may be two, three, four, or seven Orthogonal Frequency Division Multiplexing (OFDM) or Single-carrier Frequency-Division Multiple Acces (SC-FDMA) symbols, but may alternatively be no more than 14 symbols, or a length of time of no more than 1 ms.

Since the existing channel and UCI transmission are defined in the unit of a sub-frame, there has been absent so far a definite solution to the UCI transmission in a short-TTI.

SUMMARY

Embodiments of the invention provide a method and device for transmitting Uplink Control Information (UCI) so as to address transmission of UCI in a short-TTI.

In a first aspect there is provided a method for transmitting Uplink Control Information (UCI), the method including: determining, by a User Equipment (UE), a short-Transmission Time Interval (TTI) position and/or a short uplink channel for transmitting UCI; and transmitting, by the UE, the UCI in the determined short-TTI position and/or the determined short uplink channel.

In a possible implementation, determining, by the UE, the short-TTI position and/or the short uplink channel for transmitting UCI includes one of the following methods: method 1: receiving, by the UE, first configuration information indicating a periodicity and/or an offset of a feedback sub-frame for transmitting UCI, and determining a position of the feedback sub-frame according to the first configuration information; and transmitting, by the UE, the UCI in the determined short-TTI position and/or the determined short uplink channel includes: transmitting, by the UE, the UCI in a specific short-TTI position, or a specific short uplink channel, for transmitting UCI in the feedback sub-frame; or method 2: receiving, by the UE, second configuration information indicating a periodicity and/or an offset of a feedback short-TTI position for transmitting UCI, and determining the feedback short-TTI position according to the second configuration information; and transmitting, by the UE, the UCI in the determined short-TTI position and/or the determined short uplink channel includes: transmitting, by the UE, the UCI in the feedback short-TTI position.

Optionally transmitting, by the UE, the UCI in the specific short-TTI position for transmitting UCI in the feedback sub-frame includes: transmitting, by the UE, the UCI in an sPUCCH or an sPUSCH in the specific short-TTI position in the feedback sub-frame; or transmitting, by the UE, the UCI in the first sPUCCH or the last sPUCCH in the feedback sub-frame; or transmitting, by the UE, the UCI in the first sPUSCH or the last sPUSCH in the feedback sub-frame; or when the UE determines the specific short uplink channel as an sPUCCH, then transmitting, by the UE, the UCI in the specific short uplink channel in the first short-TTI or the last short-TTI in the feedback sub-frame, or transmitting the UCI in the first sPUCCH or the last sPUCCH in the feedback sub-frame; or when the UE determines the specific short uplink channel as an sPUSCH, then transmitting, by the UE, the UCI in the first sPUSCH or the last sPUSCH in the feedback sub-frame; or when the UE determines the specific short uplink channel as an sPUSCH, and there is an sPUSCH on a Primary Component Carrier (PCC) of the UE in the feedback sub-frame, then transmitting, by the UE, the UCI in the sPUSCH on the PCC; or when the UE determines the specific short uplink channel as an sPUSCH, and there is no sPUSCH on a PCC of the UE in the feedback sub-frame, then transmitting, by the UE, the UCI in an sPUSCH on an SCC with the lowest carrier index, in which there is the sPUSCH, in the feedback sub-frame.

Furthermore transmitting, by the UE, the UCI in the sPUCCH or the sPUSCH in the specific short-TTI position for transmitting UCI in the feedback sub-frame includes: when the UE supports simultaneous transmission of the sPUCCH and the sPUSCH, or there is no sPUSCH in the specific short-TTI position, then transmitting, by the UE, the UCI in the sPUCCH in the specific short-TTI position in the feedback sub-frame; or when the UE does not support simultaneous transmission of the sPUCCH and the sPUSCH, and there is an sPUSCH in the specific short-TTI position, then transmitting, by the UE, the UCI in the sPUSCH in the specific short-TTI position in the feedback sub-frame.

Furthermore transmitting, by the UE, the UCI in the sPUSCH on the PCC includes: when there are a plurality of sPUSCHs on the PCC of the UE in the feedback sub-frame, then transmitting, by the UE, the UCI in the first sPUSCH or the last sPUSCH on the PCC in the feedback sub-frame; or transmitting, by the UE, the UCI in the sPUSCH on the SCC with the lowest carrier index, in which there is the sPUSCH, in the feedback sub-frame includes: when there are a plurality of sPUSCHs on the SCC with the lowest carrier index in the feedback sub-frame, then transmitting, by the UE, the UCI in the first sPUSCH or the last sPUSCH on the SCC with the lowest carrier index in the feedback sub-frame.

Furthermore transmitting, by the UE, the UCI in the feedback short-TTI position includes: transmitting, by the UE, the UCI in an sPUCCH or an sPUSCH in the feedback short-TTI position.

Furthermore transmitting, by the UE, the UCI in an sPUCCH or an sPUSCH in the feedback short-TTI position includes: when the UE supports simultaneous transmission of the sPUCCH and the sPUSCH, or there is no sPUSCH in the feedback short-TTI position, then transmitting, by the UE, the UCI in the sPUCCH in the feedback short-TTI position; or when the UE does not support simultaneous transmission of the sPUCCH and the sPUSCH, and there is an sPUSCH in the feedback short-TTI position, then transmitting, by the UE, the UCI in the sPUSCH in the feedback short-TTI position.

In a second aspect there is provided a method for receiving Uplink Control Information (UCI), the method including: determining, by a base station, a short-Transmission Time Interval (TTI) position and/or a short uplink channel for transmitting UCI; and receiving, by the base station, the UCI in the determined short-TTI position and/or the determined short uplink channel.

In a possible implementation, determining, by the base station, the short-TTI position and/or the short uplink channel for transmitting UCI includes one of the following methods: method 1: determining, by the base station, that the UCI is transmitted in a specific short-TTI position, or a specific short uplink channel, for transmitting UCI, in a feedback sub-frame for transmitting UCI; and after the base station determines the short-TTI position and/or the short uplink channel for transmitting UCI, the method further includes: transmitting, by the base station, first configuration information indicating a periodicity and/or an offset of the feedback sub-frame to a UE; or method 2: determining, by the base station, that the UCI is transmitted in a feedback short-TTI position; and after the base station determines the short-TTI position and/or the short uplink channel for transmitting UCI, the method further includes: transmitting, by the base station, to a UE second configuration information indicating a periodicity and/or an offset of the feedback short-TTI position for transmitting UCI.

Optionally receiving, by the base station, the UCI in the determined short-TTI position and/or the determined short uplink channel includes: receiving, by the base station, the UCI in an sPUCCH or an sPUSCH in the specific short-TTI position for transmitting UCI in the feedback sub-frame; or receiving, by the base station, the UCI in the first sPUCCH or the last sPUCCH in the feedback sub-frame; or receiving, by the base station, the UCI in the first sPUSCH or the last sPUSCH in the feedback sub-frame; or when the base station determines the specific short uplink channel as an sPUCCH, then receiving, by the base station, the UCI in the specific short uplink channel in the first short-TTI or the last short-TTI in the feedback sub-frame, or receiving the UCI in the first sPUCCH or the last sPUCCH in the feedback sub-frame; or when the base station determines the specific short uplink channel as an sPUSCH, then receiving, by the base station, the UCI in the first sPUSCH or the last sPUSCH in the feedback sub-frame; or when the base station determines the specific short uplink channel as an sPUSCH, and there is an sPUSCH of a PCC of the UE in the feedback sub-frame, then receiving, by the base station, the UCI in the sPUSCH on the PCC; or when the base station determines the specific short uplink channel as an sPUSCH, and there is no sPUSCH of a PCC of the UE in the feedback sub-frame, then receiving, by the base station, the UCI in an sPUSCH on an SCC with a lowest carrier index, in which there is the sPUSCH, in the feedback sub-frame.

Furthermore receiving, by the base station, the UCI in an sPUCCH or an sPUSCH in the specific short-TTI position for transmitting UCI in the feedback sub-frame includes: when the UE supports simultaneous transmission of the sPUCCH and the sPUSCH, or there is no sPUSCH in the specific short-TTI position, then receiving, by the base station, the UCI in the sPUCCH in the specific short-TTI position in the feedback sub-frame; or when the UE does not support simultaneous transmission of the sPUCCH and the sPUSCH, and there is an sPUSCH in the specific short-TTI position, then receiving, by the base station, the UCI in an sPUSCH in the specific short-TTI position in the feedback sub-frame.

Furthermore receiving, by the base station, the UCI in the sPUSCH on the PCC includes: when there are a plurality of sPUSCHs on the PCC of the UE in the feedback sub-frame, then receiving, by the base station, the UCI in the first sPUSCH or the last sPUSCH on the PCC in the feedback sub-frame; or receiving, by the base station, the UCI in the sPUSCH on the SCC with the lowest carrier index, in which there is the sPUSCH, in the feedback sub-frame includes: when there are a plurality of sPUSCHs on the SCC with the lowest carrier index in the feedback sub-frame, then receiving, by the base station, the UCI in the first sPUSCH or the last sPUSCH on the SCC with the lowest carrier index in the feedback sub-frame.

Furthermore receiving, by the base station, the UCI in the determined short-TTI position and/or the determined short uplink channel includes: receiving, by the base station, the UCI in an sPUCCH or an sPUSCH in the feedback short-TTI position.

Furthermore receiving, by the base station, the UCI in an sPUCCH or an sPUSCH in the feedback short-TTI position includes: when the UE supports simultaneous transmission of an sPUCCH and an sPUSCH, or there is no sPUSCH in the feedback short-TTI position, then receiving, by the base station, the UCI in an sPUCCH in the feedback short-TTI position; or when the UE does not support simultaneous transmission of an sPUCCH and an sPUSCH, and there is an sPUSCH in the feedback short-TTI position, then receiving, by the base station, the UCI in an sPUSCH in the feedback short-TTI position.

In a third aspect, there is provided a computer storage medium storing program codes configured to perform the method according to the method in the first aspect.

In a fourth aspect, there is provided a computer storage medium storing program codes configured to perform the method according to the method in the second aspect.

In a fifth aspect, there is provided a UE including at least one processor and a memory; where the memory is configured to store readable program codes, and the at least one processor is configured to execute the readable program codes to: determine a short-TTI position and/or a short uplink channel for transmitting UCI; and transmit the UCI in the determined short-TTI position and/or the determined short uplink channel.

In a possible implementation, the at least one processor is configured to execute the readable program codes: to receive first configuration information indicating a periodicity and/or an offset of a feedback sub-frame for transmitting UCI, and to determine a position of the feedback sub-frame according to the first configuration information; and to transmit the UCI in a specific short-TTI position, or a specific short uplink channel, for transmitting UCI in the feedback sub-frame; or to receive second configuration information indicating a periodicity and/or an offset of a feedback short-TTI position for transmitting UCI, and to determine the feedback short-TTI position according to the second configuration information; and to transmit the UCI in the feedback short-TTI position.

Optionally the at least one processor is configured to execute the readable program codes to perform at least one of the following operations: transmitting the UCI in an sPUCCH or an sPUSCH in the specific short-TTI position in the feedback sub-frame; or when the UE supports simultaneous transmission of the sPUCCH and the sPUSCH, or there is no sPUSCH in the specific short-TTI position, transmitting the UCI in an sPUCCH in the specific short-TTI position in the feedback sub-frame; or when the UE does not support simultaneous transmission of the sPUCCH and the sPUSCH, and there is an sPUSCH in the specific short-TTI position, transmitting the UCI in an sPUSCH in the specific short-TTI position in the feedback sub-frame; or transmitting the UCI in the first sPUCCH or the last sPUCCH in the feedback sub-frame; or transmitting the UCI in the first sPUSCH or the last sPUSCH in the feedback sub-frame; or when the specific short uplink channel is determined as an sPUCCH, transmitting the UCI in the specific short uplink channel in the first short-TTI or the last short-TTI in the feedback sub-frame, or transmitting the UCI in the first sPUCCH or the last sPUCCH in the feedback sub-frame; or when the specific short uplink channel is determined as an sPUSCH, transmitting the UCI in the first sPUSCH or the last sPUSCH in the feedback sub-frame; or when the specific short uplink channel is determined as an sPUSCH, and there is an sPUSCH on a PCC of the UE in the feedback sub-frame, transmitting the UCI in the sPUSCH on the PCC; or when the specific short uplink channel is determined as an sPUSCH, and there is no sPUSCH on a PCC of the UE in the feedback sub-frame, transmitting the UCI in an sPUSCH on an SCC with the lowest carrier index, in which there is the sPUSCH, in the feedback sub-frame; or when there are a plurality of sPUSCHs on the PCC of the UE in the feedback sub-frame, transmitting the UCI in the first sPUSCH or the last sPUSCH on the PCC in the feedback sub-frame; or when there are a plurality of sPUSCHs on the SCC with the lowest carrier index in the feedback sub-frame, transmitting the UCI in the first sPUSCH or the last sPUSCH on the SCC with the lowest carrier index in the feedback sub-frame.

Furthermore the at least one processor is configured to execute the readable program codes: to transmit the UCI in an sPUCCH or an sPUSCH in the feedback short-TTI position; or when the UE supports simultaneous transmission of the sPUCCH and the sPUSCH, or there is no sPUSCH in the feedback short-TTI position, to transmit the UCI in the sPUCCH in the feedback short-TTI position; or when the UE does not support simultaneous transmission of the sPUCCH and the sPUSCH, and there is an sPUSCH in the feedback short-TTI position, to transmit the UCI in an sPUSCH in the feedback short-TTI position.

In a sixth aspect, there is provided another UE including: a memory, a transceiver, and at least one processor connected with the memory and the transceiver, where: the processor is configured to read and execute program in the memory: to determine a short-TTI position and/or a short uplink channel for transmitting UCI; and to transmit the UCI in the determined short-TTI position and/or the determined short uplink channel through the transceiver; and the transceiver is configured to receive and transmit data under the control of the processor.

In a seventh aspect, there is provided a base station including at least one processor and a memory; where the memory is configured to store readable program codes, and the at least one processor is configured to execute the readable program codes to: determine a short-TTI position and/or a short uplink channel for transmitting UCI; and receive the UCI in the determined short-TTI position and/or the determined short uplink channel.

In a possible implementation, the at least one processor is configured to execute the readable program codes: to determine that the UCI is transmitted in a specific short-TTI position, or a specific short uplink channel, for transmitting UCI, in a feedback sub-frame for transmitting UCI; and to transmit first configuration information indicating a periodicity and/or an offset of the feedback sub-frame to a UE; or to determine that the UCI is transmitted in a feedback short-TTI position; and to transmit to a UE second configuration information indicating a periodicity and/or an offset of the feedback short-TTI position for transmitting UCI.

Optionally the at least one processor is configured to execute the readable program codes to perform at least one of the following operations: receiving the UCI in an sPUCCH or an sPUSCH in the specific short-TTI position for transmitting UCI in the feedback sub-frame; or when the UE supports simultaneous transmission of the sPUCCH and the sPUSCH, or there is no sPUSCH in the specific short-TTI position, receiving the UCI in the sPUCCH in the specific short-TTI position in the feedback sub-frame; or when the UE does not support simultaneous transmission of the sPUCCH and the sPUSCH, and there is an sPUSCH in the specific short-TTI position, receiving the UCI in the sPUSCH in the specific short-TTI position in the feedback sub-frame; or receiving the UCI in the first sPUCCH or the last sPUCCH in the feedback sub-frame; or receiving the UCI in the first sPUSCH or the last sPUSCH in the feedback sub-frame; or when the specific short uplink channel is determined as an sPUCCH, receiving the UCI in the specific short uplink channel in the first short-TTI or the last short-TTI in the feedback sub-frame, or receiving the UCI in the first sPUCCH or the last sPUCCH in the feedback sub-frame; or when the specific short uplink channel is determined as an sPUSCH, receiving the UCI in the first sPUSCH or the last sPUSCH in the feedback sub-frame; or when the specific short uplink channel is determined as an sPUSCH, and there is an sPUSCH on a PCC of the UE in the feedback sub-frame, receiving the UCI in the sPUSCH on the PCC; or when the specific short uplink channel is determined as an sPUSCH, and there is no sPUSCH on a PCC of the UE in the feedback sub-frame, receiving the UCI in an sPUSCH on an SCC with the lowest carrier index, in which there is the sPUSCH, in the feedback sub-frame; or when there are a plurality of sPUSCHs on the PCC of the UE in the feedback sub-frame, receiving the UCI in the first sPUSCH or the last sPUSCH on the PCC in the feedback sub-frame; or when there are a plurality of sPUSCHs on the SCC with the lowest carrier index in the feedback sub-frame, receiving the UCI in the first sPUSCH or the last sPUSCH on the SCC with the lowest carrier index in the feedback sub-frame.

Furthermore the at least one processor is configured to execute the readable program codes: to receive the UCI in an sPUCCH or an sPUSCH in the feedback short-TTI position; or when the UE supports simultaneous transmission of the sPUCCH and the sPUSCH, or there is no sPUSCH in the feedback short-TTI position, to receive the UCI in the sPUCCH in the feedback short-TTI position; or when the UE does not support simultaneous transmission of the sPUCCH and the sPUSCH, and there is an sPUSCH in the feedback short-TTI position, to receive the UCI in the sPUSCH in the feedback short-TTI position.

In an eighth aspect, there is provided another base station including: a memory, a transceiver, and at least one processor connected with the memory and the transceiver, where: the processor is configured to read and execute program in the memory: to determine a short-TTI position and/or a short uplink channel for transmitting UCI; and to receive the UCI in the determined short-TTI position and/or the determined short uplink channel through the transceiver; and the transceiver is configured to receive and transmit data under the control of the processor.

In the methods and devices according to the embodiments of the invention, the UE firstly determines the short-TTI position and/or the short uplink channel for transmitting UCI, and then transmits the UCI in the determined short-TTI position and/or the determined short uplink channel; and the base station firstly determines the short-TTI position and/or the short uplink channel for transmitting UCI, and then receives the UCI in the determined short-TTI position and/or the determined short uplink channel, so that there is provided a solution to transmitting periodic UCI in a short-TTI, so the periodic UCI can be transmitted normally in the short-TTI.

DETAILED DESCRIPTION OF THE INVENTION

In order to make the objects, technical solutions, and advantages of the embodiments of the invention more apparent, the technical solutions according to the embodiments of the invention will be described below clearly and fully with reference to the drawings in the embodiments of the invention, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

The embodiments of the invention will be described below in further details with reference to the drawings of the invention. It shall be appreciated that the embodiments to be described here are only intended to illustrate and explain the invention, but not to limit the invention thereto.

Figure 1:
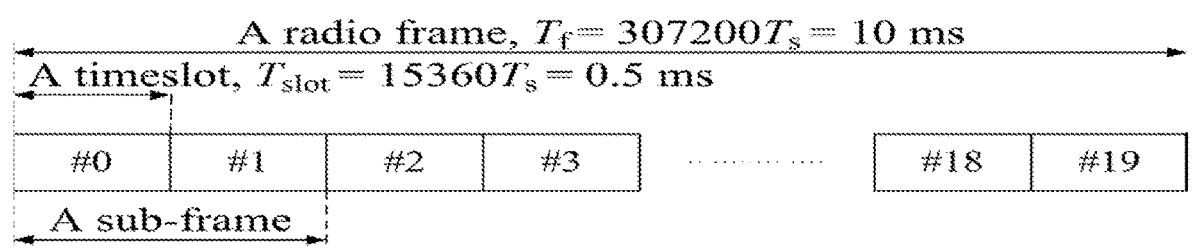
FIG. 1 is a schematic diagram of the Frame Structure type 1 (FS1) for the LTE FDD system.
Figure 2:
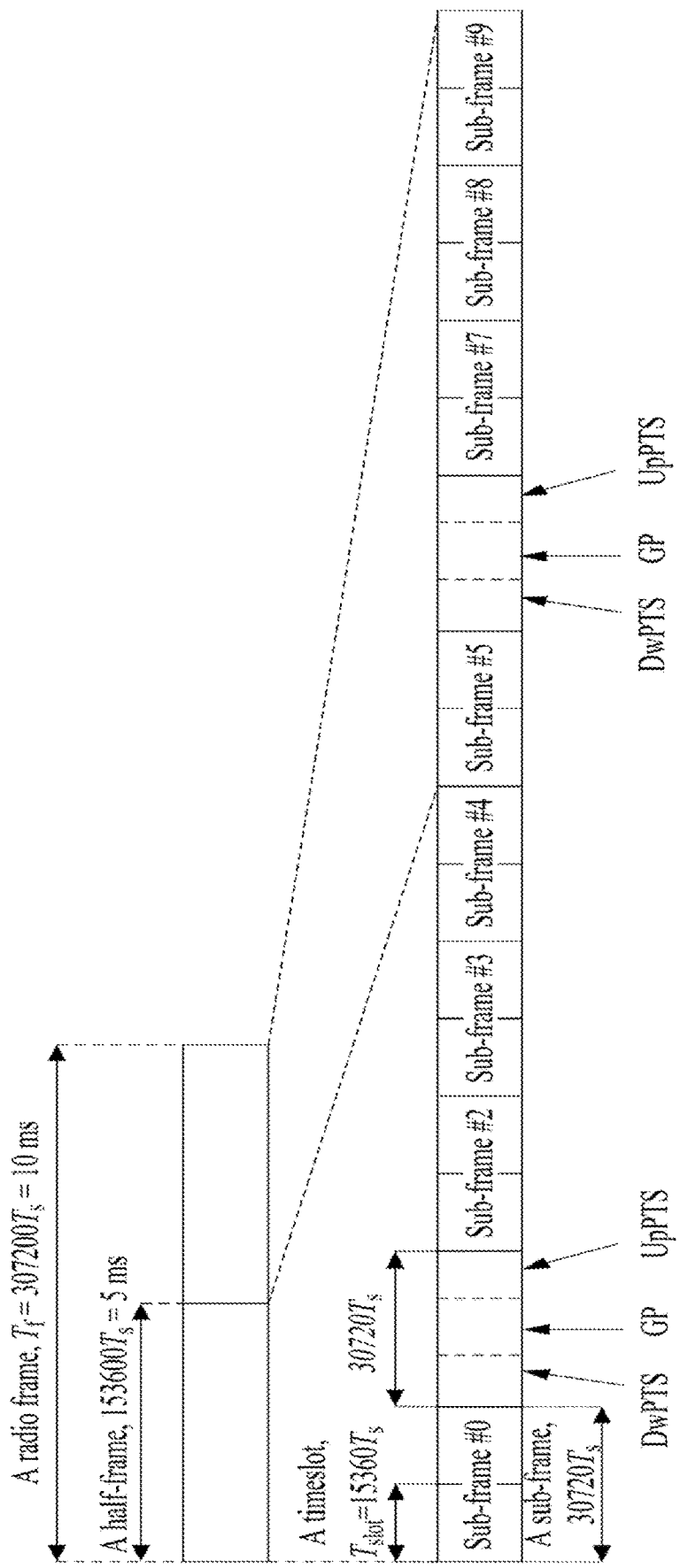
FIG. 2 is a schematic diagram of the Frame Structure type 2 (FS2) for the LTE TDD system.
Figure 3:
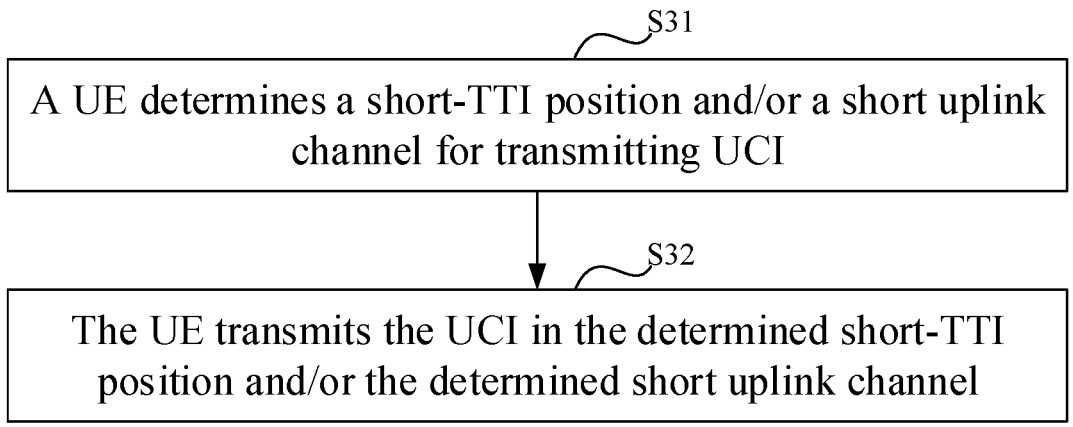
FIG. 3 is a schematic flow chart of a method for transmitting Uplink Control Information (UCI) according to an embodiment of the invention.

FIG. 3 illustrates a method for transmitting Uplink Control Information (UCI) according to an embodiment of the invention, where the method includes the following operations: in the operation S31, a UE determines a short-TTI position and/or a short uplink channel for transmitting UCI; and in the operation S32, the UE transmits the UCI in the determined short-TTI position and/or the determined short uplink channel.

Particularly when the short-TTI position for transmitting UCI is determined in the operation S31, then the UCI will be transmitted in the determined short-TTI position in the operation S32; when the short uplink channel for transmitting UCI is determined in the operation S31, then the UCI will be transmitted in the determined short uplink channel in the operation S32; and when the short-TTI position and the short uplink channel for transmitting UCI are determined in the operation S31, then the UCI will be transmitted in the determined short-TTI position and in the determined short uplink channel in the operation S32.

In the embodiment of the invention, the UE firstly determines the short-TTI position and/or the short uplink channel for transmitting UCI, and then transmits the UCI in the determined short-TTI position and/or the determined short uplink channel, so that there is provided a solution to transmitting periodic UCI in a short-TTI, so the periodic UCI can be transmitted normally in the short-TTI.

In the embodiment of the invention, the UCI includes but will not be limited to at least one of Scheduling Request (SR) information, Periodic Channel State Information (P-CSI), etc.

In the embodiment of the invention, the UE firstly determines the short-TTI position and/or the short uplink channel for transmitting UCI in the operation S31 in the following possible implementations.

In a first implementation, the UE receives first configuration information indicating a periodicity and/or an offset of a feedback sub-frame for transmitting UCI, and determines a position of the feedback sub-frame according to the first configuration information.

In this implementation, the first configuration information is transmitted via higher-layer signaling or broadcast signaling or physical-layer control signaling (e.g., a PDCCH/sPDCCH, etc.).

Optionally when a plurality of carriers are aggregated for the UE, a base station can transmit the first configuration information separately for each carrier.

In this implementation, the first configuration information indicates both the periodicity and the offset of the feedback sub-frame for transmitting UCI in the unit of a sub-frame.

Optionally one or more specific short-TTI positions can be preset or configured in the feedback sub-frame to transmit the UCI.

Optionally one or more specific short uplink channels can be preseted or configured in the feedback sub-frame to transmit the UCI.

In this implementation, the UE transmits the UCI in the determined short-TTI position and/or the determined short uplink channel in the operation S32 particularly as follows: the UE transmits the UCI in a specific short-TTI position, or in a specific short uplink channel, for transmitting UCI, in the feedback sub-frame.

I. The UE transmits the UE in the specific short-TTI position in the feedback sub-frame particularly as follows: the UE transmits the UCI in an sPUCCH or an sPUSCH in the specific short-TTI position for transmitting UCI in the feedback sub-frame.

Furthermore the UE further transmits the UCI in an sPUCCH or an sPUSCH in the specific short-TTI position for transmitting UCI in the feedback sub-frame in the following possible implementations.

In an implementation A, when the UE supports simultaneous transmission of an sPUCCH and an sPUSCH, or there is no sPUSCH in the specific short-TTI position, then the UE will transmit the UCI in an sPUCCH in the specific short-TTI position for transmitting UCI in the feedback sub-frame.

In an implementation B, when the UE does not support simultaneous transmission of an sPUCCH and an sPUSCH, and there is an sPUSCH in the specific short-TTI position, then the UE will transmit the UCI in an sPUSCH in the specific short-TTI position for transmitting UCI in the feedback sub-frame.

II. The UE transmits the UCI in the specific short uplink channel in the feedback sub-frame particularly in the following several possible implementations.

In an implementation a, the UE transmits the UCI in the first sPUCCH or the last sPUCCH in the feedback sub-frame.

In this implementation, the UE determines the specific short uplink channel by default as the first sPUCCH or the last sPUCCH in the feedback sub-frame, and the UE always transmits the UCI in the first sPUCCH or the last sPUCCH in the feedback sub-frame.

In an implementation b, the UE transmits the UCI in the first sPUSCH or the last sPUSCH in the feedback sub-frame.

In this implementation, the UE determines the specific short uplink channel by default as the first sPUSCH or the last sPUSCH in the feedback sub-frame, and the UE always transmits the UCI in the first sPUSCH or the last sPUSCH in the feedback sub-frame.

In an implementation c, when the UCI is transmitted in an sPUCCH, that is, the UE determines the specific short uplink channel as an sPUCCH, for example, the UE supports simultaneous transmission of an sPUCCH and an sPUSCH, or there is no sPUSCH transmitted in the short-TTI position, there are the following possible further implementations.

In an implementation c1, the UE transmits the UCI in the first sPUCCH or the last sPUCCH in the feedback sub-frame; or in an implementation c2, the UE transmits the UCI in the specific short uplink channel in the first short-TTI or the last short-TTI in the feedback sub-frame.

In the implementation c, the UE firstly determines the specific short uplink channels, and then selects a specific short uplink channel for transmitting the UCI.

In an implementation d, when the UCI is transmitted in an sPUSCH, that is, the UE determines the specific short uplink channel as an sPUSCH, for example, the UE does not support simultaneous transmission of an sPUCCH and an sPUSCH, and there is an sPUSCH transmitted in the preseted or configured short-TTI position, there are the following three possible further implementations.

In an implementation d1, the UE transmits the UCI in the first sPUSCH or the last sPUSCH in the feedback sub-frame.

In an implementation d2, when a plurality of carriers are aggregated for the UE, when there is an sPUSCH on a Primary Component Carrier (PCC) of the UE in the feedback sub-frame, then the UE will transmit the UCI in the sPUSCH on the PCC.

In this implementation, when there are a plurality of sPUSCHs on the PCC of the UE in the feedback sub-frame, then the UE will transmit in the first sPUSCH or the last sPUSCH in the feedback sub-frame.

In an implementation d3, when a plurality of carriers are aggregated for the UE, when there is no sPUSCH on a PCC of the UE in the feedback sub-frame, then the UE will transmit the UCI in an sPUSCH on a Secondary Component Carrier (SCC) with the lowest carrier index among the sPUSCHs in the feedback sub-frame.

In the implementation d, the UE firstly determines the specific short uplink channels, and then selects a specific short uplink channel for transmitting the UCI.

In this implementation, when there are a plurality of sPUSCHs on the SCC with the lowest carrier index in the feedback sub-frame, then the UE will transmit the UCI in the first sPUSCH or the last sPUSCH on the SCC with the lowest carrier index in the feedback sub-frame.

In a second implementation, the UE receives second configuration information indicating a periodicity and/or an offset of a feedback short-TTI position for transmitting UCI, and determines the feedback short-TTI position according to the second configuration information.

In this implementation, the second configuration information is transmitted via higher-layer signaling or broadcast signaling or physical-layer control signaling (e.g., a PDCCH/sPDCCH, etc.).

Optionally when a plurality of carriers are aggregated for the UE, a base station can transmit the second configuration information separately for each carrier.

Optionally the second configuration information indicates both the periodicity and the offset of the feedback short-TTI position for transmitting UCI in the unit of a length of a short-TTI.

Optionally the length of the short-TTI is a length of an uplink short-TTI.

In this implementation, the UE transmits the UCI in the feedback short-TTI position in the operation S32.

Furthermore, the UE transmits the UCI in an sPUCCH or an sPUSCH in the feedback short-TTI position.

Particularly, when the UE supports simultaneous transmission of an sPUCCH and an sPUSCH, or there is no sPUSCH in the feedback short-TTI position, then the UE will transmit the UCI in an sPUCCH in the feedback short-TTI position; or when the UE does not support simultaneous transmission of an sPUCCH and an sPUSCH, and there is an sPUSCH in the feedback short-TTI position, then the UE will transmit the UCI in an sPUSCH in the feedback short-TTI position.

Figure 4:
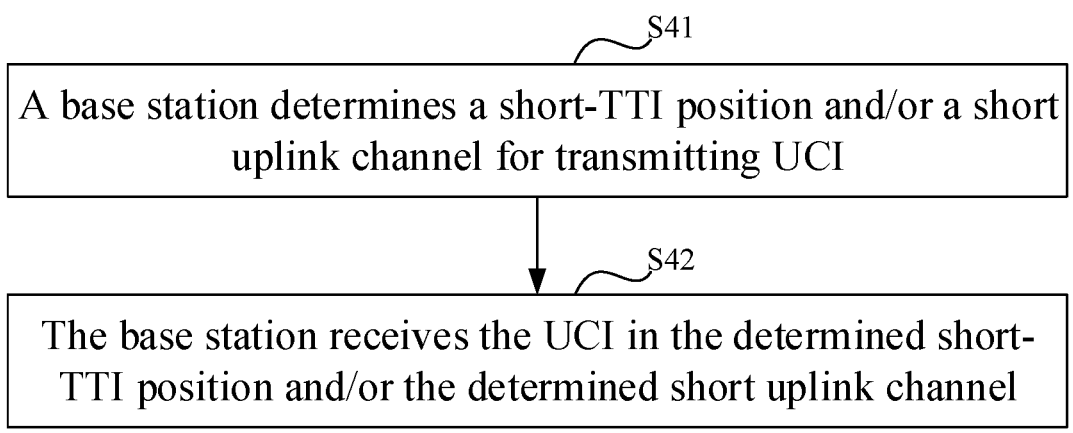
FIG. 4 is a schematic flow chart of a method for receiving Uplink Control Information (UCI) according to an embodiment of the invention.

Based upon a same inventive idea, FIG. 4 illustrates a method for receiving Uplink Control Information (UCI) according to an embodiment of the invention, and in correspondence to the transmitting method according to the embodiment as illustrated in FIG. 3, the method includes the following operations.

In the operation S41, a base station determines a short-TTI position and/or a short uplink channel for transmitting UCI.

In the operation S42, the base station receives the UCI in the determined short-TTI position and/or the determined short uplink channel.

Particularly when the short-TTI position for transmitting UCI is determined in the operation S41, then the UCI will be received in the determined short-TTI position in the operation S42; when the short uplink channel for transmitting UCI is determined in the operation S41, then the UCI will be received in the determined short uplink channel in the operation S42; and when the short-TTI position and the short uplink channel for transmitting UCI are determined in the operation S41, then the UCI will be received in the determined short-TTI position and in the determined short uplink channel in the operation S42.

In the embodiment of the invention, the base station firstly determines the short-TTI position and/or the short uplink channel for transmitting UCI, and then receives the UCI in the determined short-TTI position and/or the determined short uplink channel, so that there is provided a solution to receiving periodic UCI in a short-TTI, so the periodic UCI can be received normally in the short-TTI.

In a possible implementation, the base station determines the short-TTI position and/or the short uplink channel for transmitting UCI as follows: the base station determines that the UCI is transmitted in a specific short-TTI position, or a specific short uplink channel, for transmitting UCI, in a feedback sub-frame for transmitting UCI.

Correspondingly after the base station determines the short-TTI position and/or the short uplink channel for transmitting UCI, the method further includes: the base station transmits first configuration information indicating a periodicity and/or an offset of the feedback sub-frame to a UE.

Here the first configuration information is particularly as described in the embodiment as illustrated in FIG. 3.

Furthermore the base station receives the UCI in the determined short-TTI position and/or the determined short uplink channel as follows: the base station receives the UCI in an sPUCCH or an sPUSCH in the specific short-TTI position for transmitting UCI in the feedback sub-frame.

Furthermore the base station receives the UCI in an sPUCCH or an sPUSCH in the specific short-TTI position for transmitting UCI in the feedback sub-frame as follows: when the UE supports simultaneous transmission of an sPUCCH and an sPUSCH, or there is no sPUSCH in the specific short-TTI position, then the base station will receive the UCI in an sPUCCH in the specific short-TTI position in the feedback sub-frame; or when the UE does not support simultaneous transmission of an sPUCCH and an sPUSCH, and there is an sPUSCH in the specific short-TTI position, then the base station will receive the UCI in an sPUSCH in the specific short-TTI position in the feedback sub-frame.

Furthermore the base station receives the UCI in the specific short uplink channel for transmitting UCI in the feedback sub-frame as follows: the base station receives the UCI in the first sPUCCH or the last sPUCCH in the feedback sub-frame; or the base station receives the UCI in the first sPUSCH or the last sPUSCH in the feedback sub-frame; or when the base station determines the specific short uplink channel as an sPUCCH, then the base station will receive the UCI in the specific short uplink channel in the first short-TTI or the last short-TTI in the feedback sub-frame, or receives the UCI in the first sPUCCH or the last sPUCCH in the feedback sub-frame; or when the base station determines the specific short uplink channel as an sPUSCH, then the base station will receive the UCI in the first sPUSCH or the last sPUSCH in the feedback sub-frame; or when the base station determines the specific short uplink channel as an sPUSCH, and there is an sPUSCH on a PCC of the UE in the feedback sub-frame, then the base station will receive the UCI in the sPUSCH on the PCC; or when the base station determines the specific short uplink channel as an sPUSCH, and there is no sPUSCH on a PCC of the UE in the feedback sub-frame, then the base station will receive the UCI in an sPUSCH on an SCC with the lowest carrier index, in which there is the sPUSCH, in the feedback sub-frame.

Furthermore the base station receives the UCI in the sPUSCH on the PCC includes: when there is a plurality of sPUSCHs on the PCC of the UE in the feedback sub-frame, then the base station will receive the UCI in the first sPUSCH or the last sPUSCH on the PCC in the feedback sub-frame; or the base station receives the UCI in the sPUSCH on the SCC with the lowest carrier index, in which there is the sPUSCH, in the feedback sub-frame as follows: when there is a plurality of sPUSCHs on the SCC with the lowest carrier index in the feedback sub-frame, then the base station will receive the UCI in the first sPUSCH or the last sPUSCH on the SCC with the lowest carrier index in the feedback sub-frame.

In another possible implementation, the base station determines the short-TTI position and/or the short uplink channel for transmitting UCI as follows: the base station determines that the UCI is transmitted in a feedback short-TTI position.

Correspondingly after the base station determines the short-TTI position and/or the short uplink channel for transmitting UCI, the method further includes: the base station transmits second configuration information indicating a periodicity and/or an offset of the feedback sub-frame to a UE.

Here the second configuration information is particularly as described in the embodiment as illustrated in FIG. 3.

Furthermore the base station receives the UCI in the determined short-TTI position and/or the determined short uplink channel as follows: the base station receives the UCI in an sPUCCH or an sPUSCH in the feedback short-TTI position.

Furthermore the base station receives the UCI in an sPUCCH or an sPUSCH in the feedback short-TTI position as follows: when the UE supports simultaneous transmission of an sPUCCH and an sPUSCH, or there is no sPUSCH in the feedback short-TTI position, then the base station will receive the UCI in an sPUCCH in the feedback short-TTI position; or when the UE does not support simultaneous transmission of an sPUCCH and an sPUSCH, and there is an sPUSCH in the feedback short-TTI position, then the base station will receive the UCI in an sPUSCH in the feedback short-TTI position.

A method for transmitting Uplink Control Information (UCI) according to an embodiment of the invention will be described below in details in connection with the following three particular embodiments.

In a first embodiment, this embodiment will be described by way of an example in which an SR is fed back, and a short-TTI has a length of two symbols. For example, Table 1 depicts a feedback periodicity and a sub-frame offset of an SR, both of which are configured in the unit of a sub-frame, where sr-ConfigIndex $I_{SR}$ is a parameter preconfigured via higher-layer signaling, an SR feedback periodicity $SR_{PERIODICITY}$ and an SR sub-frame offset $N_{OFFSET,SR}$ are determined by referring to the table using the parameter, and a sub-frame satisfying an equation of $(10 \times n_f + \lfloor n_2/2 \rfloor - N_{OFFSET,SR}) \bmod SR_{PERIODICITY} = 0$ is determined as a feedback sub-frame of an SR according to the feedback periodicity and the offset, where $n_f$ is a radio frame number, $n_s$ is a timeslot number, and mod is a modulus operation.

TABLE 1

SR periodicity and sub-frame offset configuration

| SR configuration Index $I_{SR}$ | SR periodicity (ms) $SR_{PERIODICITY}$ | SR sub-frame offset $N_{OFFSET, SR}$ |
|---|---|---|
| 0-4 | 5 | $I_{SR}$ |
| 5-14 | 10 | $I_{SR} - 5$ |
| 15-34 | 20 | $I_{SR} - 15$ |
| 35-74 | 40 | $I_{SR} - 35$ |
| 75-154 | 80 | $I_{SR} - 75$ |
| 155-156 | 2 | $I_{SR} - 155$ |
| 157 | 1 | $I_{SR} - 157$ |

1) A base station determines feedback sub-frames of an SR, determines corresponding values of $I_{SR}$, and configures a UE with them via higher-layer signaling.

Figure 5A:
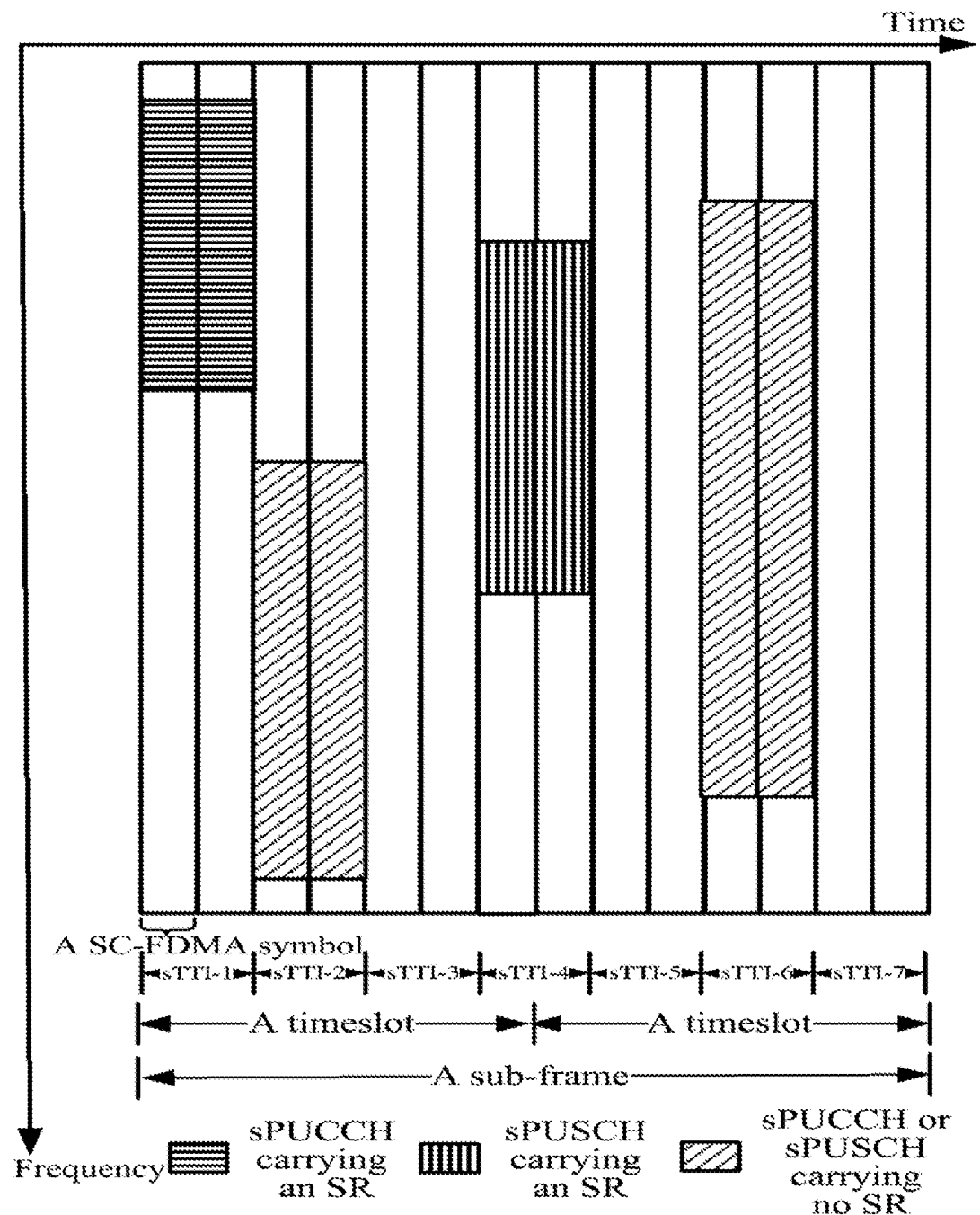
FIG. 5A and FIG. 5B are schematic diagrams of transmitting an SR according to a first embodiment of the invention.
Figure 5B:
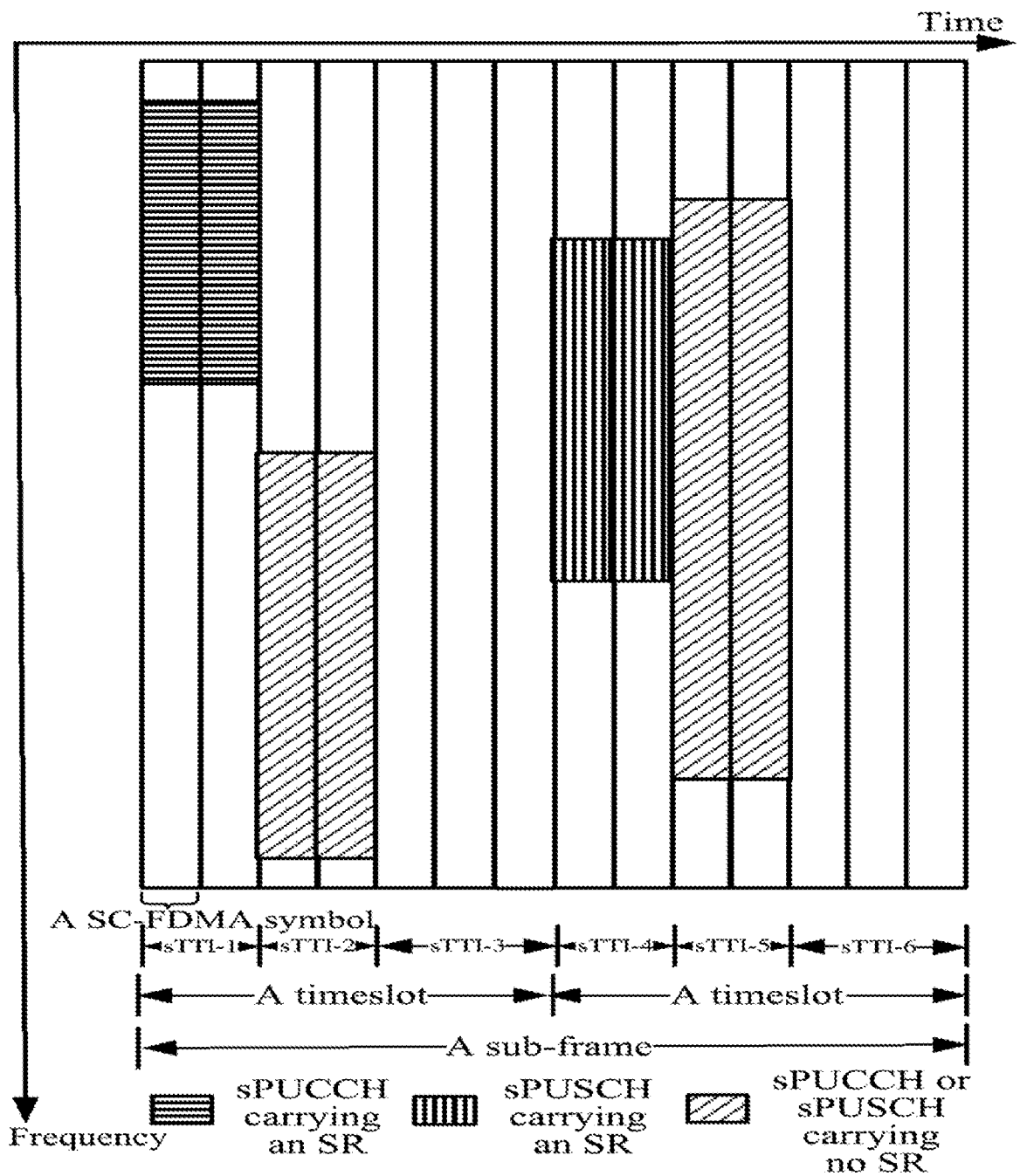

2) The base station configures the UE via signaling, or presets with the UE, one or more short-TTI positions in each feedback sub-frame as a short-TTI position or positions for transmitting an SR; and for example, the first short-TTI and the fourth short-TTI in each feedback sub-frame are short-TTI positions for transmitting an SR as illustrated in FIG. 5A and FIG. 5B; or of course, alternatively only one short-TTI position may be defined, and for example, the first short-TTI is a short-TTI position for transmitting an SR, etc. In this embodiment, an SR is transmitted in two short-TTIs, for example, but the same will apply to other numbers of short-TTI positions, so a repeated description thereof will be omitted here.

3) The UE receives the high-layer signaling, obtains the values of $I_{SR}$, and determines the feedback sub-frames of an SR by referring to Table 1 using the values; and furthermore the UE determines one or more short-TTI positions in each feedback sub-frame as a short-TTI position or positions for transmitting an SR, according to the configuration signaling of the base station, or the prescription with the base station, and for example, the first short-TTI and the fourth short-TTI in each feedback sub-frame are short-TTI positions for transmitting an SR.

4) The UE decides whether to transmit an SR (e.g., a positive SR or transmitted together with other UCI, which will apply hereinafter) in a short-TTI position for transmitting an SR in a feedback sub-frame of an SR. When not, then the UE will not transmit any SR in the short-TTI position in the feedback sub-frame; otherwise, the UE will transmit an SR in an sPUCCH or an sPUSCH in the short-TTI position in the feedback sub-frame.

A. When simultaneous transmission of an sPUCCH and an sPUSCH is supported, or there is no sPUSCH transmission in the short-TTI position for transmitting an SR, then the UE will transmit an SR in an sPUCCH.

Particularly when there is only an SR in the short-TTI position for transmitting an SR, then the UE will transmit the SR in an sPUCCH in an sPUCCH resource corresponding to the SR; and when there is also other UCI, e.g., ACK/NACK (including ACK/NACK for short-TTI downlink (DL) transmission, and/or ACK/NACK for DL transmission in a 1 ms TTI), in the short-TTI position for transmitting an SR, then the UE will transmit both the SR and the ACK/NACK in an sPUCCH in an sPUCCH resource corresponding to the ACK/NACK.

B. When simultaneous transmission of an sPUCCH and an sPUSCH is not supported, and there is sPUSCH transmission in the short-TTI position for transmitting an SR, the UE will transmit an SR (as a Buffer Status Report (BSR) together with data) in an sPUSCH.

5) The base station detects the determined short-TTI position(s) for transmitting an SR in the feedback sub-frames of an SR, blindly for an SR particularly as follows.

A. When simultaneous transmission of an sPUCCH and an sPUSCH is supported, or there is no sPUSCH transmitted in the short-TTI position for transmitting an SR (that is, the base station does not schedule any sPUSCH in the short-TTI), then the base station will detect an sPUCCH for the SR.

Particularly when there is only an SR in the short-TTI position for transmitting an SR, then the base station will detect for the SR an sPUCCH in an sPUCCH resource corresponding to the SR; and when there is also other UCI, e.g., ACK/NACK (including ACK/NACK for short-TTI DL transmission, and/or ACK/NACK for DL transmission in a 1 ms TTI), in the short-TTI position for transmitting an SR, then the base station will detect, for both the SR and ACK/NACK, an sPUCCH in an sPUCCH resource corresponding to the ACK/NACK.

B. When simultaneous transmission of an sPUCCH and an sPUSCH is not supported, and there is sPUSCH transmission in the short-TTI position for transmitting an SR (that is, the base station schedules an sPUSCH in the short-TTI), the base station will detect the sPUSCH for the SR (transmitted as a BSR together with data).

Here when the base station did not detect any sPUSCH in the short-TTI, then the base station will determine that the UE has lost scheduling signaling of the sPUSCH; and the base station may further detect an sPUCCH for an SR in the same process as described above for detecting an sPUCCH.

In a second embodiment, this embodiment will be described still by way of an example in which an SR is fed back, and a short-TTI has a length of two symbols. For example, a feedback periodicity and a sub-frame offset of an SR are configured in the unit of a sub-frame, particularly as described in the first embodiment.

1) A base station determines feedback sub-frames of an SR, determines corresponding values of $I_{SR}$, and configures a UE with them via higher-layer signaling.

2) The UE receives the high-layer signaling, obtains the values of $I_{SR}$, and determines the feedback sub-frames of an SR by referring to Table 1 using the values.

Figure 6A:
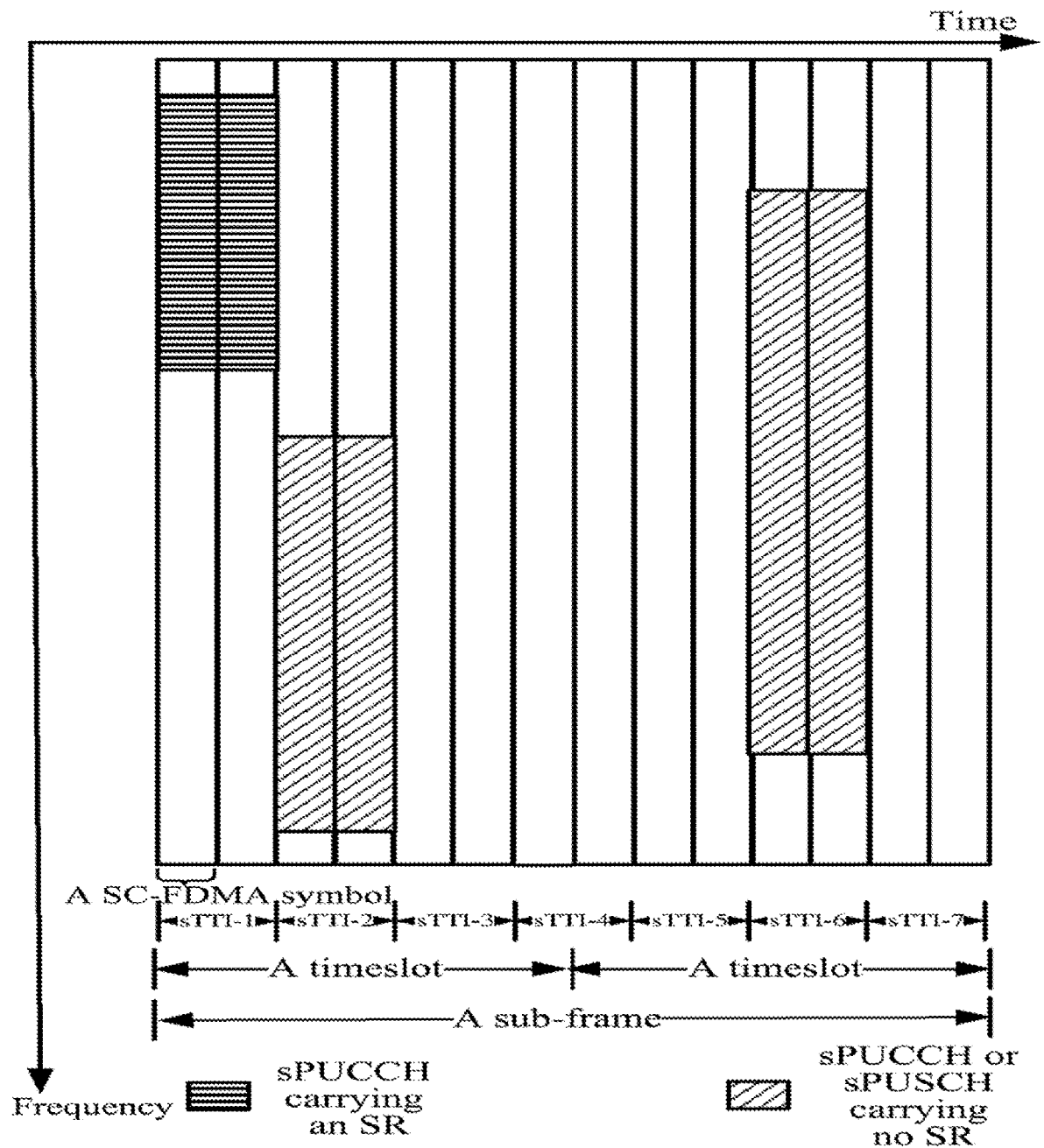
FIG. 6A and FIG. 6B are schematic diagrams of transmitting an SR according to a second embodiment of the invention.
Figure 6B:
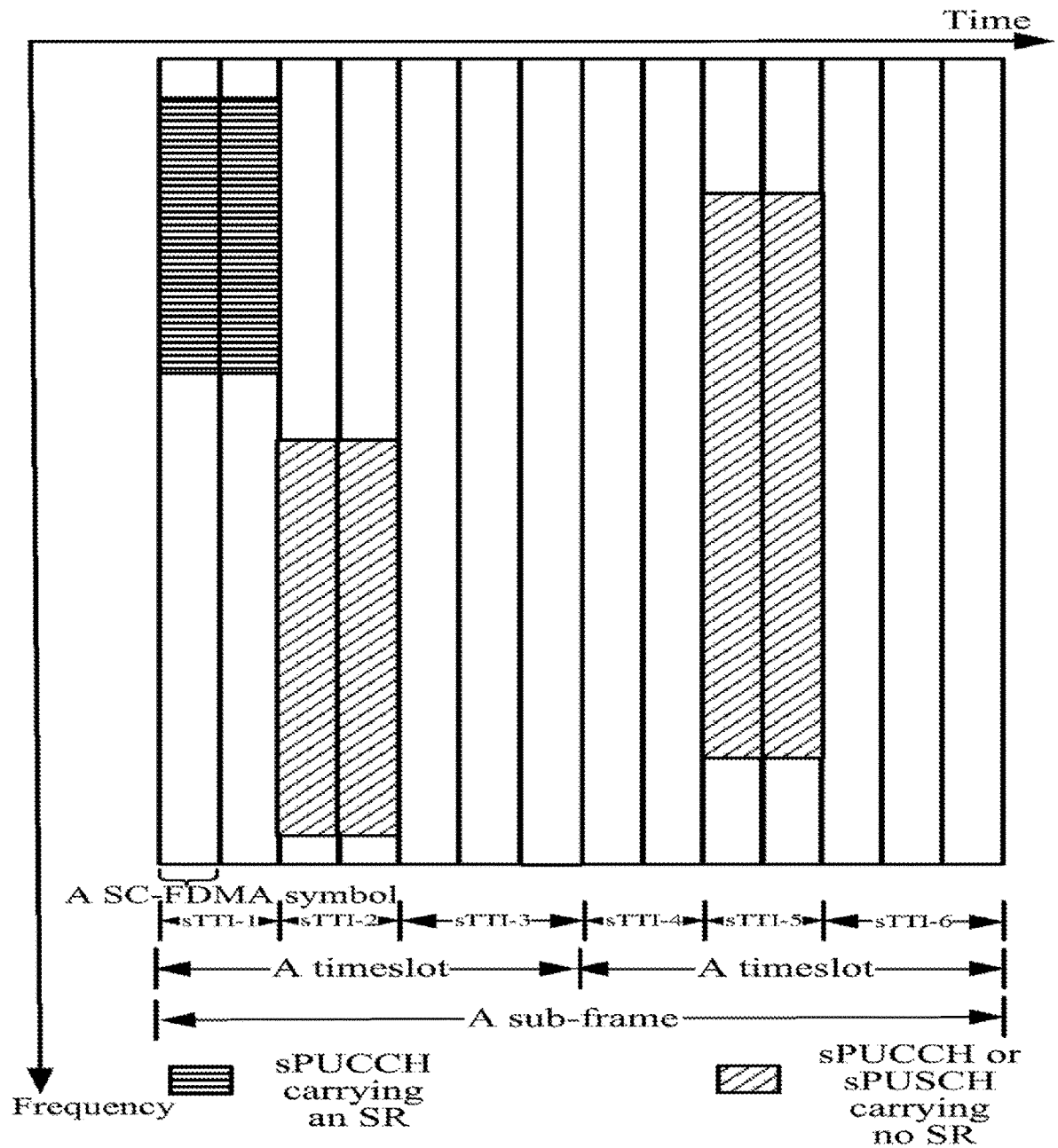

3) The UE decides whether to transmit an SR (e.g., a positive SR or transmitted together with other UCI) in a feedback sub-frame of the SR, and when not, then the UE will not transmit any SR; otherwise: A. When it is decided to transmit an SR in an sPUCCH (for example, no sPUSCH is scheduled, or an sPUSCH is scheduled and simultaneous transmission of an sPUCCH and an sPUSCH is supported), then the UE will decide to transmit an SR in an sPUCCH in the first short-TTI position in the feedback sub-frame, according to configuration signaling or a prescription, as illustrated in FIG. 6A and FIG. 6B, particularly when there is only an SR in the feedback sub-frame, then the UE will transmit the SR in an sPUCCH in an sPUCCH resource corresponding to the SR; and when there is also other UCI, e.g., ACK/NACK (including ACK/NACK for short-TTI DL transmission, and/or ACK/NACK for DL transmission in a 1 ms TTI), in the feedback sub-frame, then the UE will transmit both the SR and the ACK/NACK in an sPUCCH in an sPUCCH resource corresponding to the ACK/NACK; B. When it is decided to transmit an SR in an sPUSCH (for example, an sPUSCH is scheduled, and simultaneous transmission of an sPUCCH and an sPUSCH is not supported), the UE decides to transmit an SR in the first sPUSCH in the feedback sub-frame (the first sPUSCH may not be an sPUSCH transmitted in the first short-TTI in the feedback sub-frame, and an sPUSCH is transmitted in the first short-TTI as illustrated in FIG. 6A and FIG. 6B only by way of an example in this embodiment, but the position of an sPUSCH in the current feedback sub-frame is scheduled by the base station, and may alternatively lie in the second short-TTI or a subsequent short-TTI, and the same will apply hereinafter), according to configuration signaling or a prescription.

Figure 7A:
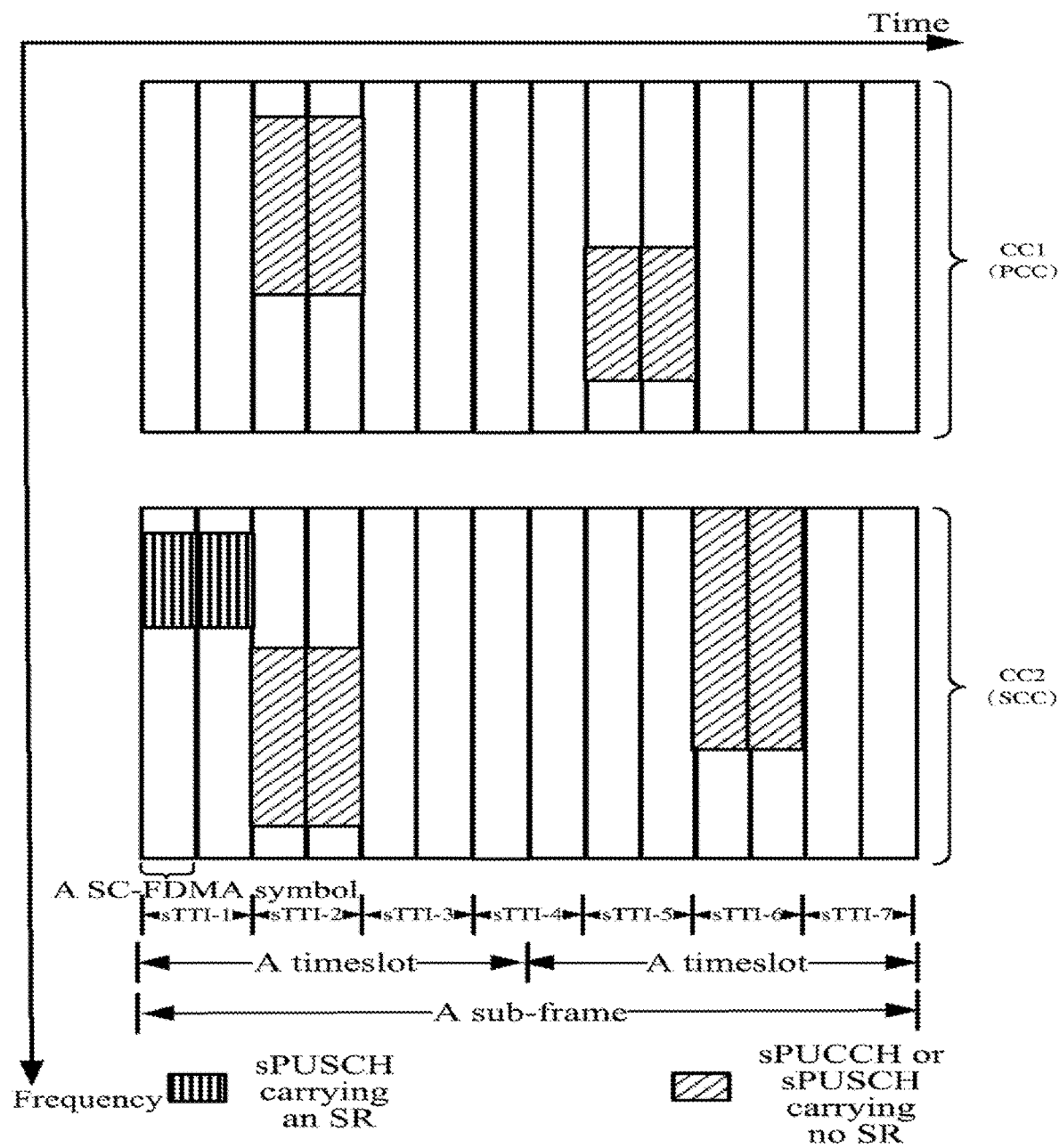
FIG. 7A and FIG. 7B are further schematic diagrams of transmitting an SR according to the second embodiment of the invention.
Figure 7B:
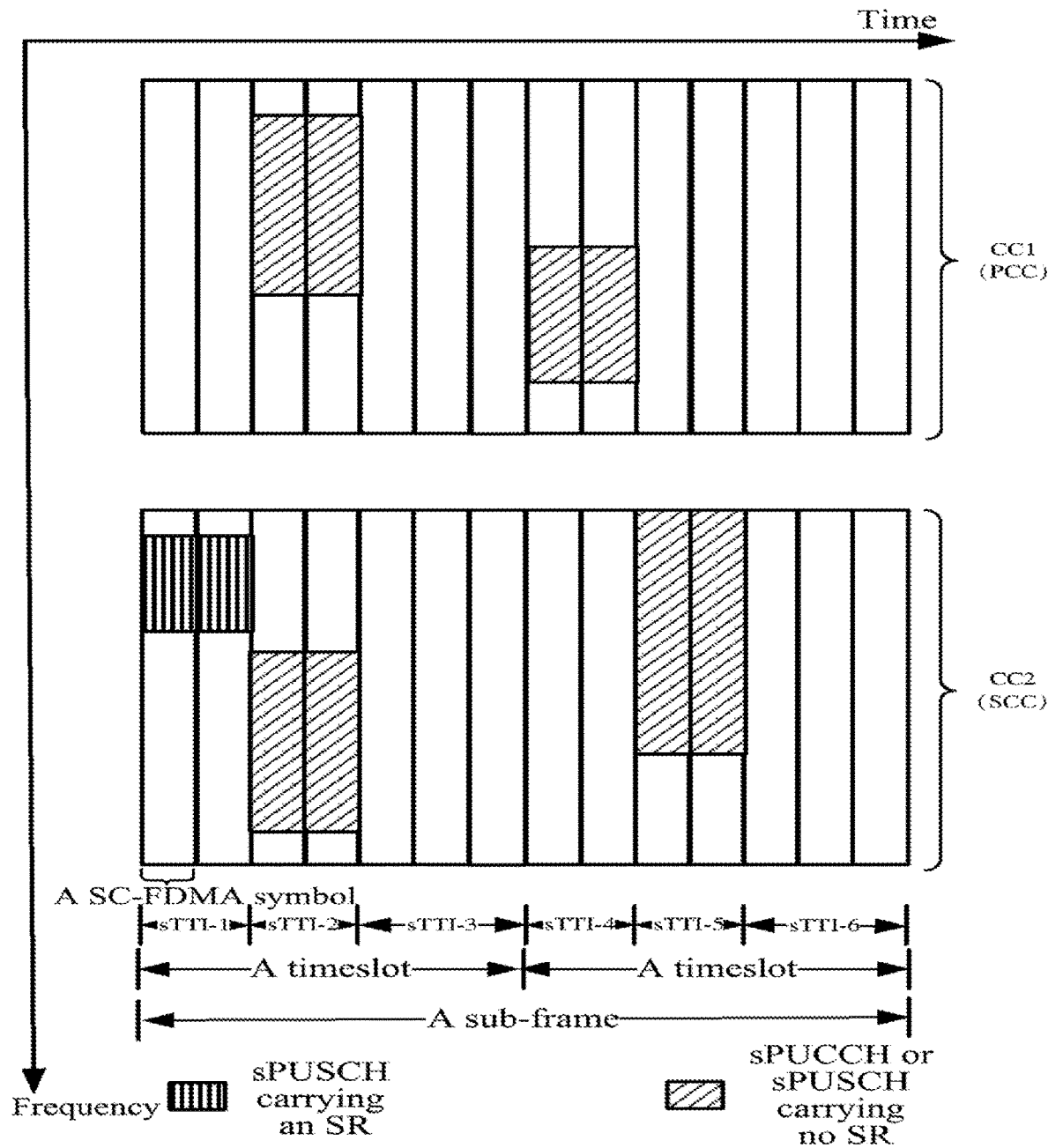

In an implementation, the UE always selects the first sPUSCH in the feedback sub-frame, for transmitting an SR, and when a plurality of carriers are aggregated for the UE, then the UE will select the first sPUSCH of the plurality of carriers in the feedback sub-frame, for transmitting an SR, as illustrated in FIG. 7A and FIG. 7B.

Figure 8A:
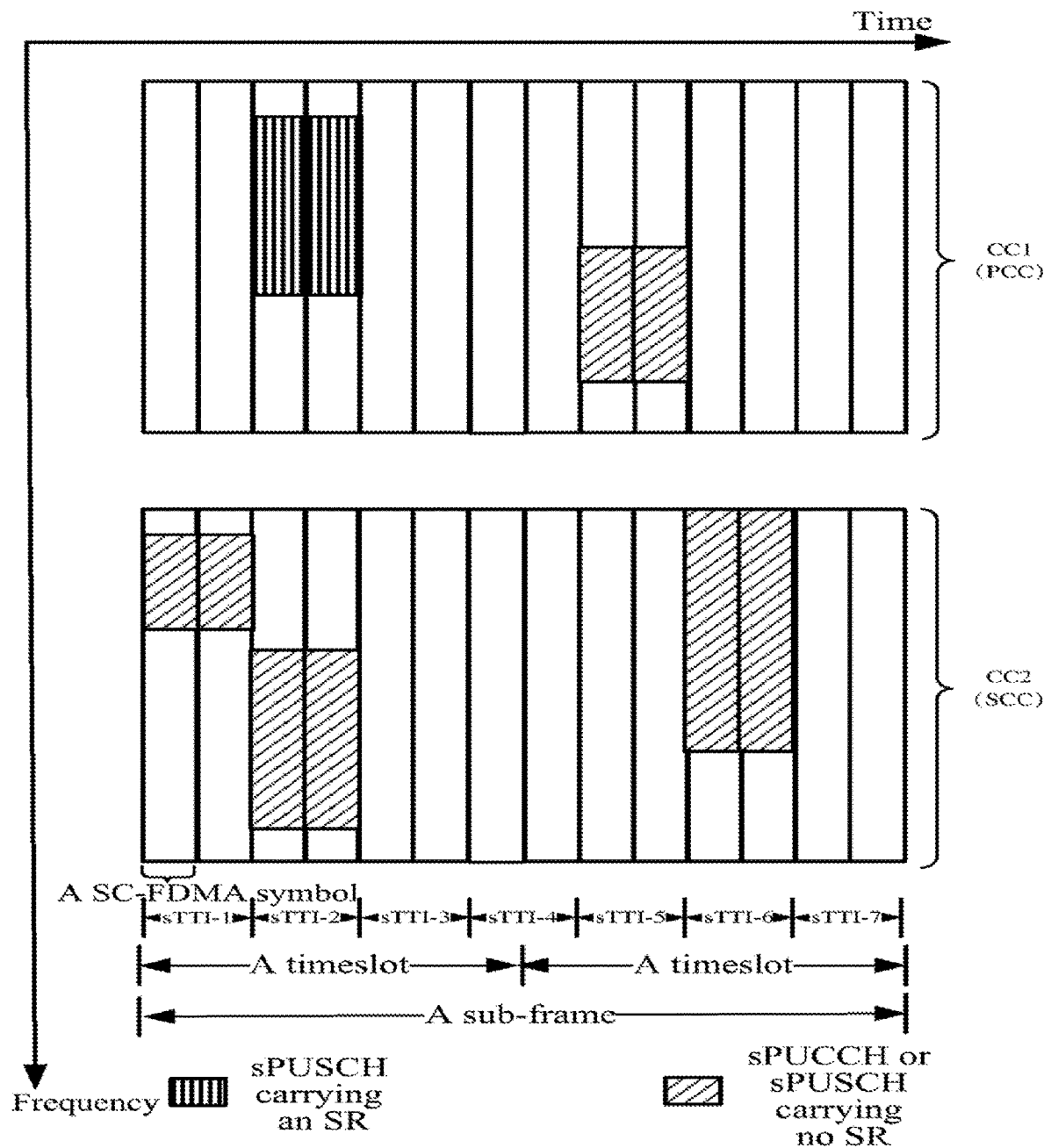
FIG. 8A and FIG. 8B are still further schematic diagrams of transmitting an SR according to the second embodiment of the invention.
Figure 8B:
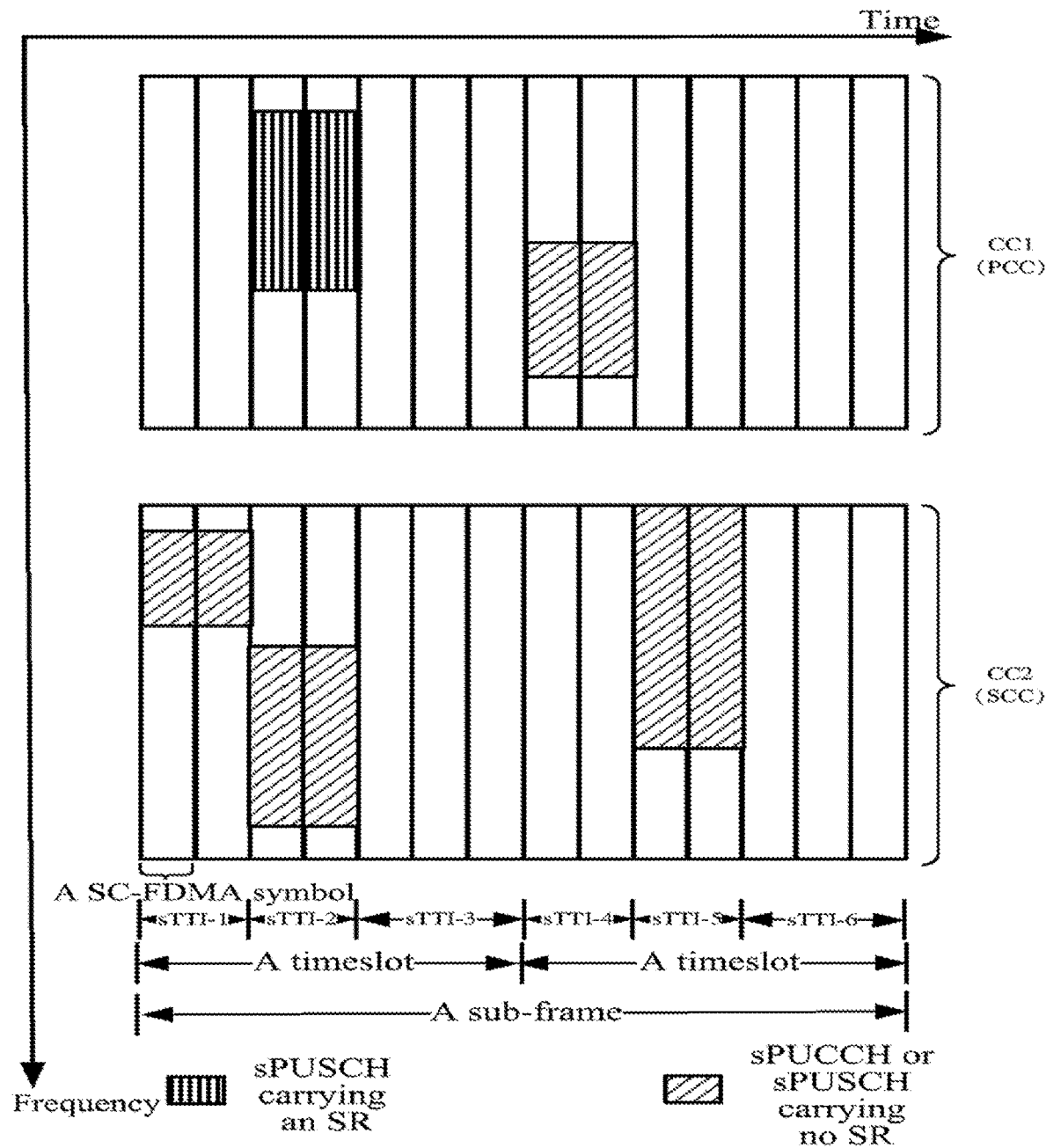

In another implementation, when there is sPUSCH transmission on a PCC in the feedback sub-frame, then the UE will transmit in the sPUSCH on the PCC, and when there are a plurality of sPUSCHs on the PCC in the feedback sub-frame, then the UE will transmit an SR in the first sPUSCH; and when there is no sPUSCH transmission on the PCC in the feedback sub-frame, then the UE will transmit an SR in an sPUSCH on an SCC with the lowest carrier index, in which the sPUSCH is transmitted, in the feedback sub-frame, and when there are a plurality of sPUSCHs on the SCC in the feedback sub-frame, then the UE will transmit an SR in the first sPUSCH, as illustrated in FIG. 8A and FIG. 8B.

4) The base station detects the determined feedback sub-frames of an SR, blindly for an SR particularly as follows.

A. When the base station determines that an SR is transmitted in an sPUCCH in the feedback sub-frame (for example, no sPUSCH is scheduled, or an sPUSCH is scheduled and simultaneous transmission of an sPUCCH and an sPUSCH is supported), the base station decides to detect for an SR an sPUCCH in the first short-TTI position in the feedback sub-frame, according to the configuration signaling or the prescription.

Particularly when there is only an SR in the feedback sub-frame, then the base station will detect for the SR in an sPUCCH in an sPUCCH resource corresponding to the SR; and when there is also other UCI, e.g., ACK/NACK (including ACK/NACK for DL transmission in a short-TTI, and/or ACK/NACK for DL transmission in a 1 ms TTI), in the feedback sub-frame, then the base station will detect, for both the SR and ACK/NACK, an sPUCCH in an sPUCCH resource corresponding to the ACK/NACK.

B. When the base station determines that an SR is transmitted in an sPUSCH (for example, an sPUSCH is scheduled, and simultaneous transmission of an sPUCCH and an sPUSCH is not supported), the base station decides to obtain an SR in the first sPUSCH in the feedback sub-frame (i.e., the first sPUSCH scheduled by the base station, which may not be transmitted in the first short-TTI in the sub-frame), according to the configuration signaling or a prescription.

In an implementation, the base station always selects the first sPUSCH in the feedback sub-frame, for detecting an SR, and when a plurality of carriers are aggregated for the UE, then the base station will select the first sPUSCH on the plurality of carriers in the feedback sub-frame, for detecting an SR.

In another implementation, when there is an sPUSCH transmitted on a PCC in the feedback sub-frame (that is, the base station schedules an sPUSCH, and the same will apply hereinafter), then the base station will detect the sPUSCH on the PCC for an SR, and when there are a plurality of sPUSCHs on the PCC in the feedback sub-frame, then the base station will detect the first sPUSCH for an SR; and when there is no sPUSCH transmitted on the PCC in the feedback sub-frame, then the base station will detect for an SR an sPUSCH on an SCC with the lowest carrier index, in which the sPUSCH is transmitted, in the feedback sub-frame, and when there are a plurality of sPUSCHs on the SCC in the feedback sub-frame, then the base station will detect the first sPUSCH for an SR.

Here when the base station did not detect any sPUSCH in a short-TTI transmitted in the scheduled first sPUSCH above, then the base station will determine that the UE has lost scheduling signaling of the sPUSCH (equivalently the UE side mistakes the second sPUSCH scheduled by the base station for the first sPUSCH); and the base station may further attempt on obtaining an SR in the next scheduled sPUSCH.

In a third embodiment, this embodiment will be described still by way of an example in which an SR is fed back, and a short-TTI has a length of two symbols. For example, a feedback periodicity and a sub-frame offset of an SR are configured in the unit of a short-TTI of two symbols; and a table like Table 1 can be defined to represent a feedback periodicity and a sub-frame offset in the unit of a short-TTI, and a feedback short-TTI position of an SR can be determined according to the feedback periodicity and the sub-frame offset.

Figure 9A:
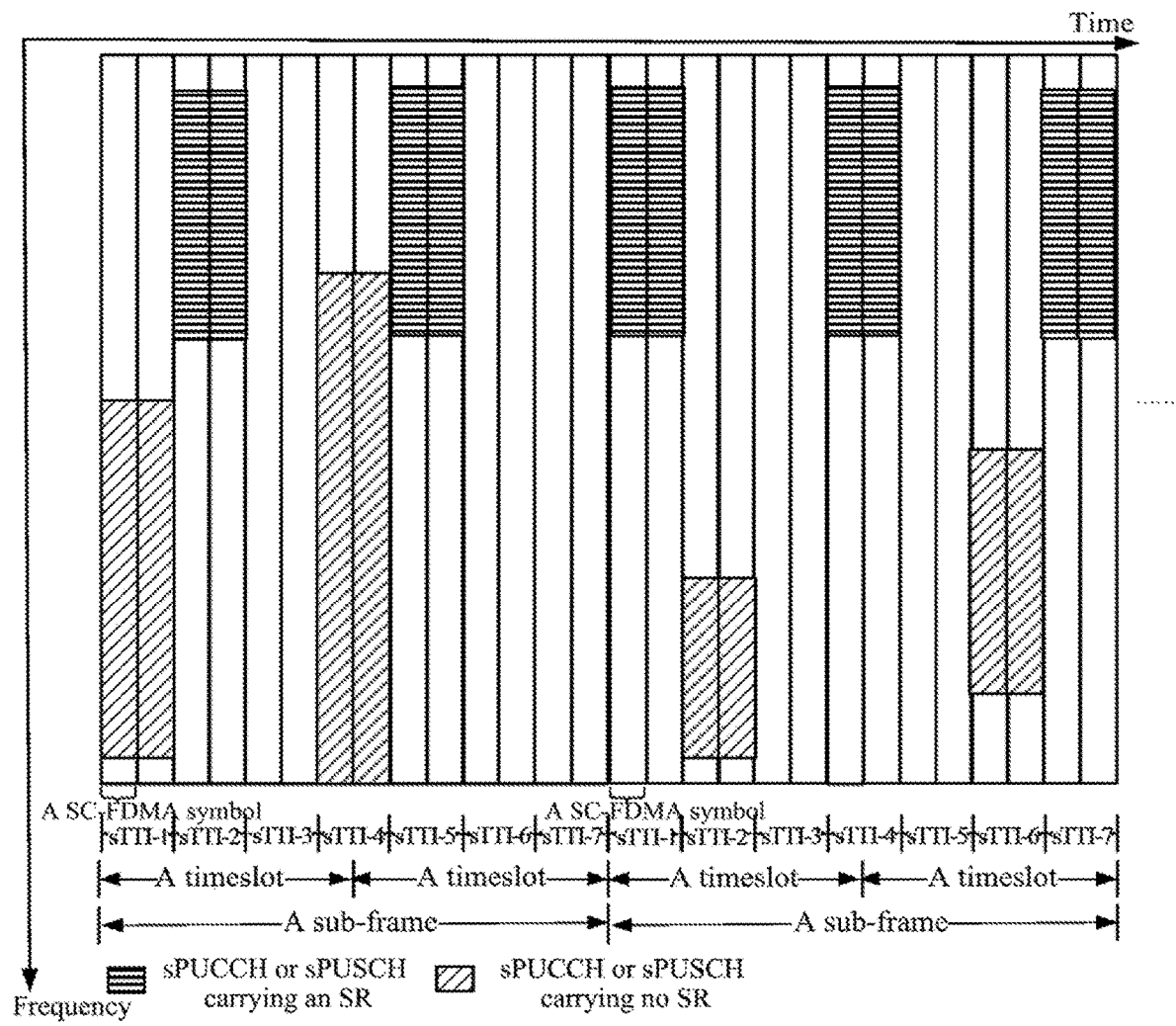
FIG. 9A and FIG. 9B are schematic diagrams of transmitting an SR according to a third embodiment of the invention.
Figure 9B:
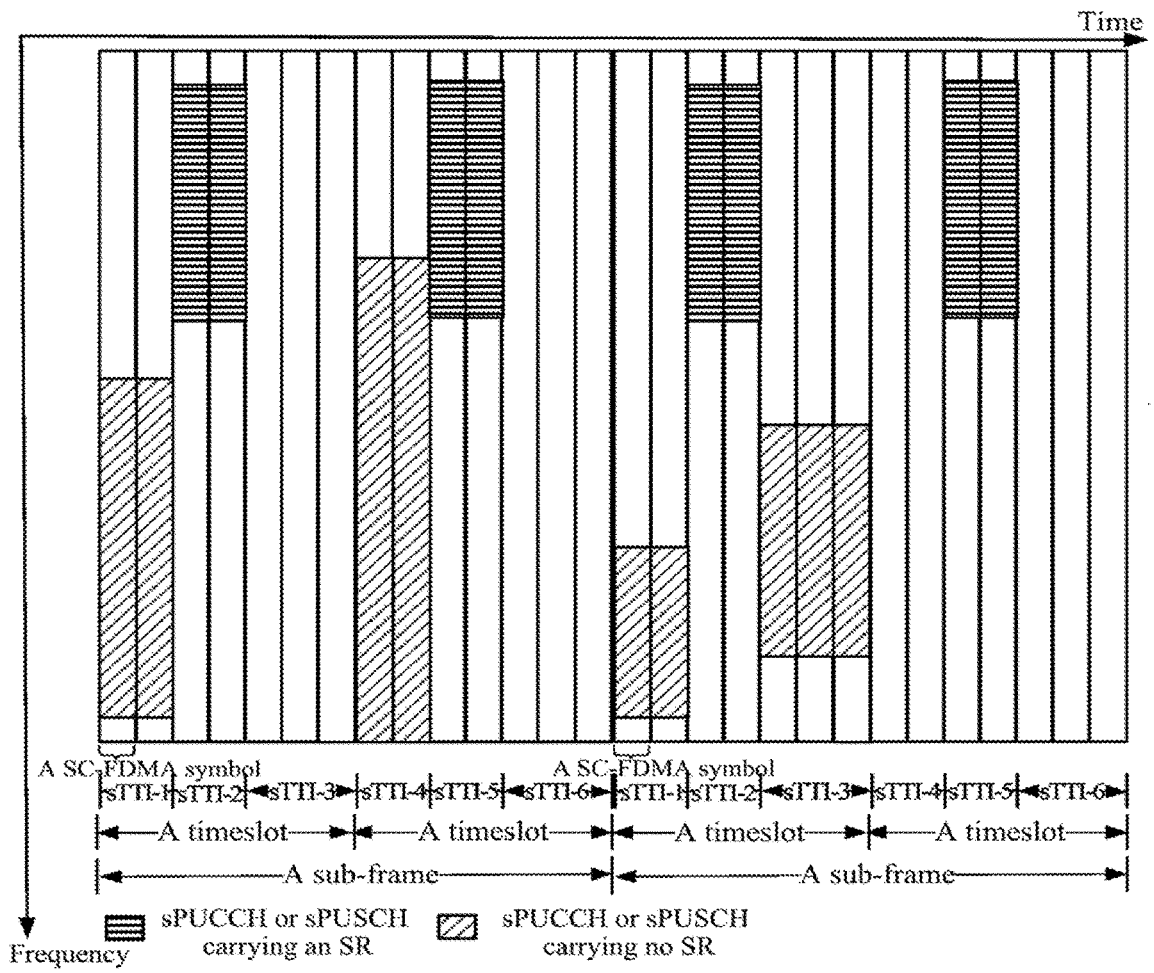

1) A base station determines feedback short-TTI positions of an SR, and for example, the base station determines that an SR can be transmitted in one of each three short-TTIs at an offset 1, that is, starting with the second short-TTI, so an SR can be transmitted in the short-TTI positions as illustrated in FIG. 9A and FIG. 9B; and the base station can notify a UE of the configured short-TTI positions via higher-layer signaling.

2) The UE receives the higher-layer signaling, and determines that an SR is transmitted in short-TTI positions starting with the second short-TTI, and an SR can be transmitted in one of each three short-TTI, so an SR can be transmitted in the short-TTI positions as illustrated in FIG. 9A and FIG. 9B.

3) The UE determines whether to transmit an SR (e.g., a positive SR or transmitted together with other UCI) in a short-TTI position for transmitting an SR; and when not, then the UE will not transmit any SR; otherwise, the UE will transmit an SR in the short-TTI position for transmitting an SR, particularly in the same process as in the first embodiment where the UE decides to transmit an SR in a short-TTI position for transmitting an SR in a feedback sub-frame, so a repeated description thereof will be omitted here.

4) The base station detects the determined short-TTI positions for transmitting an SR, blindly for an SR, and the base station detects for an SR each short-TTI position for transmitting an SR, in the same process as in the first embodiment where the base station detects for an SR a short-TTI position for transmitting an SR in a feedback sub-frame, so a repeated description thereof will be omitted here.

It shall be noted that the embodiments above have been described only by way of an example in which there is transmission in a short-TTI of two symbols, but the same will apply to transmission in a short-TTI of other symbol lengths, and a repeated description thereof will be omitted here; and a sub-frame can alternatively be divided into short-TTIs differently from the embodiments above. The embodiments above have been described only by way of an example in which an SR is transmitted, but the same will apply transmission of periodical CSI, and a repeated description thereof will be omitted here. The embodiments above have been described only by way of an example in which all the time positions in a sub-frame are in the uplink, but the same will apply to a sub-frame including time positions, a part of which are in the uplink (e.g., a special sub-frame), or an inconsecutive uplink sub-frame (e.g., a TDD sub-frame), and a repeated description thereof will be omitted here.

The processing flows of the methods above can be performed in software program, the software program can be stored in a storage medium, and when the stored software program is invoked, it can perform the operations in the methods above.

Based upon the same inventive idea, an embodiment of the invention further provides a UE, and since the UE addresses the problem under a similar principle to the method as illustrated in FIG. 3, reference can be made to the related description in the implementation of the method for an implementation of the UE, and a repeated description thereof will be omitted here.

Figure 10:
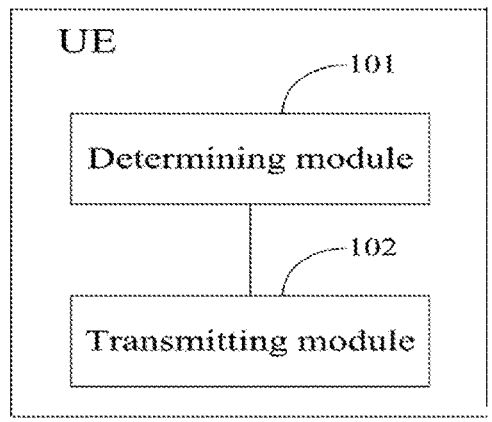
FIG. 10 is a schematic diagram of a UE according to an embodiment of the invention.

FIG. 10 illustrates a UE according to an embodiment of the invention, where the UE includes: a determining module 101 is configured to determine a short-TTI position and/or a short uplink channel for transmitting UCI; and a transmitting module 102 is configured to transmit the UCI in the determined short-TTI position and/or the determined short uplink channel.

In a possible implementation, the determining module 101 is configured: to receive first configuration information indicating a periodicity and/or an offset of a feedback sub-frame for transmitting UCI, and to determine a position of the feedback sub-frame according to the first configuration information; and the transmitting module 102 is configured to transmit the UCI in a specific short-TTI position, or a specific short uplink channel, for transmitting UCI in the feedback sub-frame.

Optionally the transmitting module 102 is configured to transmit the UCI in an sPUCCH or an sPUSCH in the specific short-TTI position for transmitting UCI in the feedback sub-frame.

Furthermore the transmitting module 102 is configured: when the UE supports simultaneous transmission of an sPUCCH and an sPUSCH, or there is no sPUSCH in the specific short-TTI position, to transmit the UCI in an sPUCCH in the specific short-TTI position in the feedback sub-frame; or when the UE does not support simultaneous transmission of an sPUCCH and an sPUSCH, and there is an sPUSCH in the specific short-TTI position, to transmit the UCI in an sPUSCH in the specific short-TTI position in the feedback sub-frame.

In a possible implementation, the transmitting module 102 is configured: to transmit the UCI in the first sPUCCH or the last sPUCCH in the feedback sub-frame; or to transmit the UCI in the first sPUSCH or the last sPUSCH in the feedback sub-frame; or when the specific short uplink channel is determined as an sPUCCH, to transmit the UCI in the specific short uplink channel in the first short-TTI or the last short-TTI in the feedback sub-frame; or when the specific short uplink channel is determined as an sPUSCH, and there is an sPUSCH on a PCC of the UE in the feedback sub-frame, to transmit the UCI in the sPUSCH on the PCC; or when the specific short uplink channel is determined as an sPUSCH, and there is no sPUSCH on a PCC of the UE in the feedback sub-frame, to transmit the UCI in an sPUSCH on an SCC with the lowest carrier index, in which there is the sPUSCH, in the feedback sub-frame.

Furthermore the transmitting module 102 is configured: when there are a plurality of sPUSCHs on the PCC of the UE in the feedback sub-frame, to transmit the UCI in the first sPUSCH or the last sPUSCH on the PCC in the feedback sub-frame; or when there are a plurality of sPUSCHs on the SCC with the lowest carrier index in the feedback sub-frame, to transmit the UCI in the first sPUSCH or the last sPUSCH on the SCC with the lowest carrier index in the feedback sub-frame.

In another possible implementation, the determining module 101 is configured: to receive second configuration information indicating a periodicity and/or an offset of a feedback short-TTI position for transmitting UCI, and to determine the feedback short-TTI position according to the second configuration information; and the transmitting module 102 is configured to transmit the UCI in the feedback short-TTI position.

Furthermore the transmitting module 102 is configured: to transmit the UCI in an sPUCCH or an sPUSCH in the feedback short-TTI position.

Furthermore the transmitting module 102 is configured: when the UE supports simultaneous transmission of an sPUCCH and an sPUSCH, or there is no sPUSCH in the feedback short-TTI position, to transmit the UCI in an sPUCCH in the feedback short-TTI position; or when the UE does not support simultaneous transmission of an sPUCCH and an sPUSCH, and there is an sPUSCH in the feedback short-TTI position, to transmit the UCI in an sPUSCH in the feedback short-TTI position.

Figure 11:
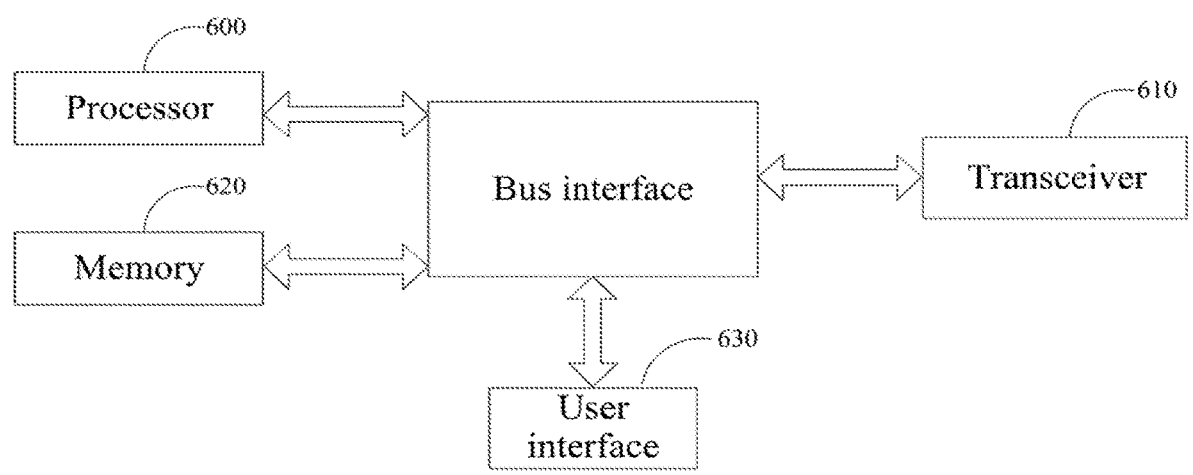
FIG. 11 is a schematic diagram of another UE according to an embodiment of the invention.

FIG. 11 illustrates another UE according to an embodiment of the invention, where the UE includes a transceiver, and at least one processor connected with the transceiver: the processor 600 is configured to read and execute program in a memory 620: to determine a short-TTI position and/or a short uplink channel for transmitting UCI; and to transmit the UCI in the determined short-TTI position and/or the determined short uplink channel through a transceiver 610; and the transceiver 610 is configured to receive and transmit data under the control of the processor 600.

In FIG. 11, the bus architecture can include any number of interconnecting buses and bridges to particularly link together various circuits including one or more processors represented by the processor 600, and one or more memories represented by the memory 620. The bus architecture can further link together various other circuits, e.g., a peripheral device, a manostat, a power management circuit, etc., all of which are well known in the art, so a further description thereof will be omitted in this context. The bus interface serves an interface. The transceiver 610 can be an element, or a number of elements, e.g., a number of transmitters and receivers, which are units for communication with various other devices over a transmission medium. For different user equipments, the user interface 630 can also be an interface via which devices can be connected internally and externally as needed, and the connected device include but will not be limited to a keypad, a monitor, a speaker, a microphone, a joystick, etc. The processor 600 is responsible for managing the bus architecture and performing normal processes, and can further various functions including timing, a peripheral interface, voltage regulation, power source management, and other control functions, and the memory 620 can store data for use by the processor 600 in performing the operations.

Optionally the processor 600 can be a Central Processing Unit (CPU), an Application Specific Integrated Circuit (ASIC), a Field-Programmable Gate Array (FPGA), or a Complex Programmable Logic Device (CPLD).

In the embodiment of the invention, the processor 600 reads the program in the memory 620, and particularly performs the method in the embodiment as illustrated in FIG. 3.

Based upon the same inventive idea, an embodiment of the invention further provides a base station, and since the base station addresses the problem under a similar principle to the method as illustrated in FIG. 4, reference can be made to the related description in the implementation of the method for an implementation of the base station, and a repeated description thereof will be omitted here.

Figure 12:
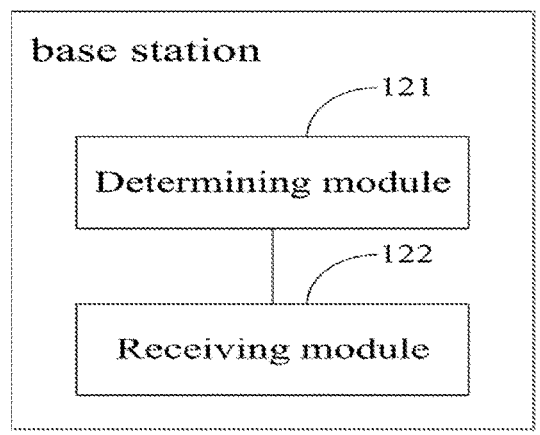
FIG. 12 is a schematic diagram of a base station according to an embodiment of the invention.

FIG. 12 illustrates a base station according to an embodiment of the invention, where the base station includes: a determining module 121 is configured to determine a short-TTI position and/or a short uplink channel for transmitting UCI; and a receiving module 122 is configured to receive the UCI in the determined short-TTI position and/or the determined short uplink channel.

In a possible implementation, the determining module 121 is configured: to determine that the UCI is transmitted in a specific short-TTI position, or in a specific short uplink channel, for transmitting UCI, in a feedback sub-frame for transmitting UCI; and to transmit first configuration information indicating a periodicity and/or an offset of the feedback sub-frame to a UE.

Furthermore the receiving module 122 is configured: to receive the UCI in an sPUCCH or an sPUSCH in the specific short-TTI position for transmitting UCI in the feedback sub-frame.

Furthermore the receiving module 122 is configured: when the UE supports simultaneous transmission of an sPUCCH and an sPUSCH, or there is no sPUSCH in the specific short-TTI position, to receive the UCI in an sPUCCH in the specific short-TTI position in the feedback sub-frame; or when the UE does not support simultaneous transmission of an sPUCCH and an sPUSCH, and there is an sPUSCH in the specific short-TTI position, to receive the UCI in an sPUSCH in the specific short-TTI position in the feedback sub-frame.

Furthermore the receiving module 122 is configured: to receive the UCI in the first sPUCCH or the last sPUCCH in the feedback sub-frame; or to receive the UCI in the first sPUSCH or the last sPUSCH in the feedback sub-frame; or when the specific short uplink channel is determined as an sPUCCH, to receive the UCI in the specific short uplink channel in the first short-TTI or the last short-TTI in the feedback sub-frame; or when the specific short uplink channel is determined as an sPUSCH, and there is an sPUSCH on a PCC of the UE in the feedback sub-frame, to receive the UCI in the sPUSCH on the PCC; or when the specific short uplink channel is determined as an sPUSCH, and there is no sPUSCH on a PCC of the UE in the feedback sub-frame, to receive the UCI in an sPUSCH on an SCC with the lowest carrier index, in which there is the sPUSCH, in the feedback sub-frame.

Furthermore the receiving module 122 is configured: when there are a plurality of sPUSCHs on the PCC of the UE in the feedback sub-frame, to receive the UCI in the first sPUSCH or the last sPUSCH on the PCC in the feedback sub-frame; or when there are a plurality of sPUSCHs on the SCC with the lowest carrier index in the feedback sub-frame, to receive the UCI in the first sPUSCH or the last sPUSCH on the SCC with the lowest carrier index in the feedback sub-frame.

In another possible implementation, the determining module 121 is configured: to determine that the UCI is transmitted in a feedback short-TTI position; and to transmit to a UE second configuration information indicating a periodicity and/or an offset of the feedback short-TTI position for transmitting UCI.

Furthermore the receiving module 122 is configured: to receive the UCI in an sPUCCH or an sPUSCH in the feedback short-TTI position.

Furthermore the receiving module 122 is configured: when the UE supports simultaneous transmission of an sPUCCH and an sPUSCH, or there is no sPUSCH in the feedback short-TTI position, to receive the UCI in an sPUCCH in the feedback short-TTI position; or when the UE does not support simultaneous transmission of an sPUCCH and an sPUSCH, and there is an sPUSCH in the feedback short-TTI position, to receive the UCI in an sPUSCH in the feedback short-TTI position.

Figure 13:
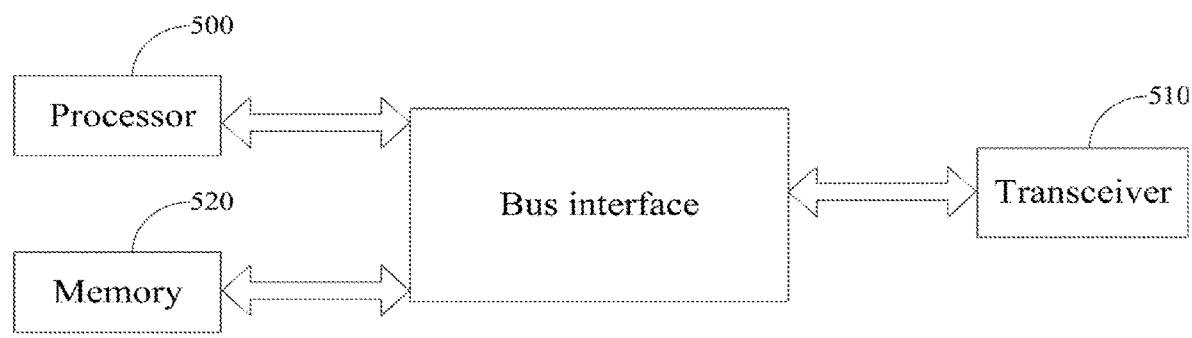
FIG. 13 is a schematic diagram of another base station according to an embodiment of the invention.

FIG. 13 illustrates another base station according to an embodiment of the invention, where the base station includes a transceiver, and at least one processor connected with the transceiver: the processor 500 is configured to read and execute program in a memory 520: to determine a short-TTI position and/or a short uplink channel for transmitting UCI; and to receive the UCI in the determined short-TTI position and/or the determined short uplink channel through the transceiver 510; and the transceiver 510 is configured to receive and transmit data under the control of the processor 500.

In FIG. 13, the bus architecture can include any number of interconnecting buses and bridges to particularly link together various circuits including one or more processors represented by the processor 500, and one or more memories represented by the memory 520. The bus architecture can further link together various other circuits, e.g., a peripheral device, a manostat, a power management circuit, etc., all of which are well known in the art, so a further description thereof will be omitted in this context. The bus interface serves an interface. The transceiver 510 can be a number of elements, e.g., can include a number of transmitters and receivers, which are units for communication with various other devices over a transmission medium. The processor 500 is responsible for managing the bus architecture and performing normal processes, and can further various functions including timing, a peripheral interface, voltage regulation, power source management, and other control functions, and the memory 520 can store data for use by the processor 500 in performing the operations.

Optionally the processor 500 can be a CPU, an ASIC, an FPGA, or a CPLD.

In the embodiment of the invention, the processor 500 reads the program in the memory 520, and particularly performs the method in the embodiment as illustrated in FIG. 4.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer usable storage mediums (including but not limited to a disk memory, a CD-ROM, an optical memory, etc.) in which computer usable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting Uplink Control Information (UCI), the method comprising:
    determining, by a User Equipment (UE), a short-Transmission Time Interval (TTI) position and/or a short uplink channel for transmitting UCI; and
    transmitting, by the UE, the UCI in the determined short-TTI position and/or the determined short uplink channel;
    wherein determining, by the UE, the short-TTI position and/or the short uplink channel for transmitting UCI comprises:
    receiving, by the UE, second configuration information, wherein the second configuration information indicates a periodicity and an offset of a feedback short-TTI position for transmitting UCI, or indicates a periodicity of a feedback short-TTI position for transmitting UCI, and the periodicity and/or the offset are/is in the unit of a length of a short TTI, and determining, by the UE, the feedback short-TTI position according to the second configuration information; and
    transmitting, by the UE, the UCI in the determined short-TTI position and/or the determined short uplink channel comprises: transmitting, by the UE, the UCI in the feedback short-TTI position;
    wherein the UCI comprises at least one of Scheduling Request (SR) or Periodic Channel State Information (P-CSI).

2. The method according to claim 1, wherein transmitting, by the UE, the UCI in the feedback short-TTI position comprises:
    transmitting, by the UE, the UCI in a sPUCCH or a sPUSCH in the feedback short-TTI position.

3. The method according to claim 2, wherein transmitting, by the UE, the UCI in the sPUCCH or the sPUSCH in the feedback short-TTI position comprises:
    when the UE supports simultaneous transmission of the sPUCCH and the sPUSCH, or there is no sPUSCH in the feedback short-TTI position, then transmitting, by the UE, the UCI in the sPUCCH in the feedback short-TTI position; or
    when the UE does not support simultaneous transmission of the sPUCCH and the sPUSCH, and there is a sPUSCH in the feedback short-TTI position, then transmitting, by the UE, the UCI in the sPUSCH in the feedback short-TTI position.

4. A method for receiving Uplink Control Information (UCI), the method comprising:
    determining, by a base station, a short-Transmission Time Interval (TTI) position and/or a short uplink channel for transmitting UCI; and
    receiving, by the base station, the UCI in the determined short-TTI position and/or the determined short uplink channel;
    wherein determining, by the base station, the short-TTI position and/or the short uplink channel for transmitting UCI comprises:
    determining, by the base station, that the UCI is transmitted in a feedback short-TTI position; and
    after the base station determines the short-TTI position and/or the short uplink channel for transmitting UCI, the method further comprises: transmitting, by the base station, second configuration information to a UE, wherein the second configuration information indicates a periodicity and an offset of the feedback short-TTI position for transmitting UCI, or indicates a periodicity of a feedback short-TTI position for transmitting UCI, and the periodicity and/or the offset are/is in the unit of a length of a short TTI to a UE;

wherein the UCI comprises at least one of Scheduling Request (SR) or Periodic Channel State Information (P-CSI).

5. The method according to claim 4, wherein receiving, by the base station, the UCI in the determined short-TTI position and/or the determined short uplink channel comprises:
receiving, by the base station, the UCI in a sPUCCH or a sPUSCH in the feedback short-TTI position.

6. The method according to claim 5, wherein receiving, by the base station, the UCI in the sPUCCH or the sPUSCH at the feedback short-TTI position comprises:
when the UE supports simultaneous transmission of the sPUCCH and the sPUSCH, or there is no sPUSCH in the feedback short-TTI position, then receiving, by the base station, the UCI in the sPUCCH in the feedback short-TTI position; or
when the UE does not support simultaneous transmission of the sPUCCH and the sPUSCH, and there is a sPUSCH in the feedback short-TTI position, then receiving, by the base station, the UCI in the sPUSCH in the feedback short-TTI position.

7. A User Equipment (UE) comprising at least one processor and a memory; wherein the memory is configured to store readable program codes, and the at least one processor is configured to execute the readable program codes to:
determine a short-Transmission Time Interval (TTI) position and/or a short uplink channel for transmitting Uplink Control Information (UCI); and
transmit the UCI in the determined short-TTI position and/or the determined short uplink channel;
wherein the at least one processor is configured to execute the readable program codes to:
receive second configuration information, wherein the second configuration information indicates a periodicity and an offset of a feedback short-TTI position for transmitting UCI, or indicates a periodicity of a feedback short-TTI position for transmitting UCI, and the periodicity and/or the offset are/is in the unit of a length of a short TTI, and determine the feedback short-TTI position according to the second configuration information; and
transmit the UCI in the feedback short-TTI position;
wherein the UCI comprises at least one of Scheduling Request (SR) or Periodic Channel State Information (P-CSI).

8. The UE according to claim 7, wherein the at least one processor is configured to execute the readable program codes:
to transmit the UCI in a sPUCCH or a sPUSCH in the feedback short-TTI position; or
when the UE supports simultaneous transmission of the sPUCCH and the sPUSCH, or there is no sPUSCH in the feedback short-TTI position, to transmit the UCI in the sPUCCH in the feedback short-TTI position; or
when the UE does not support simultaneous transmission of the sPUCCH and the sPUSCH, and there is a sPUSCH in the feedback short-TTI position, to transmit the UCI in the sPUSCH in the feedback short-TTI position.

9. A base station, comprising at least one processor and a memory; wherein the memory is configured to store readable program codes, and the at least one processor is configured to execute the readable program codes to:
determine a short-Transmission Time Interval (TTI) position and/or a short uplink channel for transmitting UCI; and
receive the UCI in the determined short-TTI position and/or the determined short uplink channel;
wherein the at least one processor is configured to execute the readable program codes:
to determine that the UCI is transmitted in a feedback short-TTI position; and
to transmit second configuration information to a UE, wherein the second configuration information indicates a periodicity and an offset of the feedback short-TTI position for transmitting UCI, or indicates a periodicity of a feedback short-TTI position for transmitting UCI, and the periodicity and/or the offset are/is in the unit of a length of a short TTI;
wherein the UCI comprises at least one of Scheduling Request (SR) or Periodic Channel State Information (P-CSI).

10. The base station according to claim 9, wherein the at least one processor is configured to execute the readable program codes:
to receive the UCI in a sPUCCH or a sPUSCH in the feedback short-TTI position; or
when the UE supports simultaneous transmission of the sPUCCH and the sPUSCH, or there is no sPUSCH in the feedback short-TTI position, to receive the UCI in the sPUCCH in the feedback short-TTI position;
or
when the UE does not support simultaneous transmission of the sPUCCH and the sPUSCH, and there is a sPUSCH in the feedback short-TTI position, to receive the UCI in the sPUSCH in the feedback short-TTI position.

\* \* \* \* \*